United States Patent [19]

Hirata et al.

[11] Patent Number: 4,683,754
[45] Date of Patent: Aug. 4, 1987

[54] CAPACITIVE DISPLACEMENT TRANSDUCER

[75] Inventors: Terutaka Hirata; Tadashi Azegami; Atsushi Kimura; Megumi Katayama, all of Tokyo, Japan

[73] Assignee: Yokogawa Hokushin Electric Corporation, Tokyo, Japan

[21] Appl. No.: 857,045

[22] Filed: Apr. 29, 1986

[30] Foreign Application Priority Data

Apr. 30, 1985 [JP] Japan ................................. 60-92889

[51] Int. Cl.$^4$ .......................... G01L 9/12; G01L 19/04
[52] U.S. Cl. ......................................... 73/708; 73/718
[58] Field of Search .......................... 73/718, 724, 708; 324/61 R; 361/283

[56] References Cited

U.S. PATENT DOCUMENTS

| | | | |
|---|---|---|---|
| 4,387,601 | 6/1983 | Azegami | 73/718 |
| 4,467,655 | 8/1984 | Lee | 73/708 |
| 4,550,611 | 11/1985 | Czarnocki | 73/718 |
| 4,625,560 | 12/1986 | Sanders | 73/718 |

*Primary Examiner*—Donald O. Woodiel
*Attorney, Agent, or Firm*—Moonray Kojima

[57] ABSTRACT

A capacitive displacement type transducer, wherein the oscillation frequency of a self-excited oscillator circuit including a pair of differential capacitors formed with a movable electrode disposed between two outer electrodes is counted by a counter, the output level of the counter is reversed each time a certain count is attained to cause the differential capacitances to be switched alternatively, and to make identical the respective reversal periods, and application voltage to be applied to the differential capacitors being controlled by an integrator, and a voltage relating to the output of the integrator being applied through a fixed impedance to the movable electrode, thereby eliminating fixed capacitances formed across the difference capacitors. Also, a voltage generated by dividing and averaging the output level of the counter by use of a certain pulse duration of a monostable circuit operating in synchronism with a counter, is used to compensate for static pressure changes. Also, a temperature sensing element is included in a converting section to perform temperature correction. The circuit may be used in a two wire transmission system. The circuit improves upon the prior art by eliminating heretofore used complex circuits, thereby increasing reliability, efficiency and reducing size.

13 Claims, 37 Drawing Figures $CT_1$ Output = "H"
$G_6$ Output = "L"

$CT_1$ Output = "H"
$G_6$ Output = "H"

$CT_1$ Output = "L"
$G_6$ Output = "L"

$CT_1$ Output = "L"
$G_6$ Output = "H"

CT₁ Output = "H"
G₆ Output = "L"

CT₁ Output = "H"
G₆ Output = "H"

CT₁ Output = "L"
G₆ Output = "L"

CT₁ Output = "L"
G₆ Output = "H"

CAPACITIVE DISPLACEMENT TRANSDUCER

BACKGROUND OF THE INVENTION

1. Field of Invention

This invention relates to a capacitive displacement transducer used for converting a displacement caused by a change of a physical quantity, such as pressure, into an electrical signal using electrostatic capacitances; and, more particularly, to a novel capacitive displacement transducer which is capable of eliminating adverse influence due to distributed capacitance, such as appearing between an electrode and a casing, to fixed capacitances, such as appearing between electrodes, and the like, and furthermore, which is capable of compensating for zero point fluctuations and span fluctuations, such as caused by changes in ambient temperature and static pressure.

2. Description of the Prior Art

Capacitive displacement transducers of the above type have been used, for example, to detect flow rate, pressures, etc, wherein the quantity to be measured causes changes of capacitance which are then converted into electrical signals which are in turn transmitted to remote receiving stations.

However, prior capacitive displacement transducers are deficient in that since there exists distributed capacitances between fixed and movable electrodes and a body forming the casing and/or between the fixed and movable electrodes, the conversion characteristics exhibit non-linearity and/or error of measurement arising from such distributed capacitances.

One solution to such deficiency is proposed in Japan Patent Application Ser. No. 57-26711 entitled "Capacitive Displacement Transducer" and corresponding U.S. Pat. No. 4,387,601 and is described herein in FIGS. 1, 2, 3 and 4.

FIG. 1 depicts a sensor section of a capacitive displacement transducer comprising a body 10 in the form of a single chamber configuration having two diaphragms 11, 12 disposed on either end surface of body 10 for receiving pressures $P_H$ and $P_L$ (see arrows) whose peripheries are welded to body 10. A hollow chamber surrounded by a through hole 13 bored in body 10 and by diaphragms 11,12 is filled with a sealing liquid 14, such as, for example, silicone oil.

In the central portion of the hollow chamber there are arranged a movable electrode 16 and fixed electrodes 17,18 disposed opposite to movable electrode 16 to form electrostatic capacitances $C_1$ and $C_2$. Each of these electrodes 16,17, 18, is supported at one end thereof by an insulating material disposed in body 10. A rod 19 passing through the hollow chamber couples together diaphragm 11, 12 at their central portions. The central portion of rod 19 is secured to movable electrode 16 in the inside of an electrode chamber. Displacement of diaphragms 11,12, in response to a differential pressure ($P_H$-$P_L$), is transferred to movable electrode 16 to thereby differentially displace capacitances $C_1$ and $C_2$.

FIG. 2 is an electrical equivalent circuit diagram of the sensor section of FIG. 1. Between movable electrode 16 and body 10 is formed a distributed capacitance $C_S$. Between movable electrode 16 and fixed electrode 17,18 are formed fixed capacitances $C_F$. These capacitances do not change regardless of the differential pressure ($P_H$-$P_L$). On the other hand, capacitances $C_1$, $C_2$ have capacitances which vary differentially in response to the differential pressure ($P_H$-$P_L$).

FIG. 3 depicts a displacement converting section for converting differential pressure into an electrical signal corresponding thereto, using the sensor section of FIG. 1, wherein the connection point, between capacitances $C_1$ and $C_2$, is connected to the input end (B) of an inverter $G_1$. Between the output end (C) and the input end (B) of inverter $G_1$ is connected a constant value current limiting circuit $CC_1$ in a negative feedback circuit. Output end (C) of inverter $G_1$ is connected first to input end $C_L$ of an n-bit counter $CT_1$, whose output end $Q_n$ is connected through a NAND gate to fixed electrode 17 to form a first electrode of capacitor $C_1$, and second through an inverter $G_3$ and a NAND gate $G_4$ to fixed electrode 18 to form a second electrode of capacitor $C_2$. The other input end of each of NAND gates $G_2$ and $G_4$ is connected to output end (C) of inverter $G_1$.

A first positive feedback loop acting on inverter $G_1$ is formed by NAND gate $G_2$ and capacitance $C_1$. A second positive feedback loop acting on inverter $G_1$ is formed by NAND gate $G_4$ and capacitance $C_2$. These feedback loops are alternately switched by means of the output of counter $CT_1$ through NAND gates $G_2,G_4$ to sustain oscillation. The output ($Q_n$) of counter $CT_1$ is smoothed by a filter circuit $FC_1$.

The operation of the foregoing will now be described with reference to FIG. 4 and ignoring fixed capacitance $C_F$ to simplify description. As shown in FIG. 4, line (A), when the output (A) of NAND gage $G_2$ is at a high level H (H will be referred to herein as a high level) and provides a voltage $+V_z$, by its leading edge the composite capacitance $C_t$, comprising capacitance $C_1$, distributed capacitance $C_s$ and capacitance $C_2$, is charged in series, and the potential of the input end of inverter $G_1$ reaches up quickly to a certain voltage and rises substantially vertically as shown in FIG. 4, line (B). Consequently, a change $e_1$ of the terminal voltage of distributed capacitance $C_s$, evaluated while taking a threshold level $V_{TH}$ of inverter $G_1$ as a reference, is represented by the following equation:

$$e_1 = \frac{C_1}{C_1 + C_t} V_z \quad (1)$$

At this moment, the output (C) of inverter $G_1$ is at a low level L (L will be referred to herein as a low level). Thus, since the constant value current limiting circuit $CC_1$ is connected between the input (B) and the output (C) ends of inverter $G_1$, the charges stored in distributed capacitance $C_s$ and capacitance $C_2$ start immediately to discharge through constant value current limiting circuit $CC_1$ and the output impedance of inverter $G_1$. However, since a discharge current i, caused by the foregoing discharge action, is restricted to a certain value by constant value current limiting circuit $CC_1$, the voltage at the input end of inverter $G_1$ is lowered linearly, as shown in FIG. 4, line (B). A discharge time $t_1$ required for that voltage to go down to threshold level $V_{TH}$ is given by the following.

$$it_1 = e_1(C_1 + C_t) \quad (2)$$

By combining equations (1) and (2), the following is obtained.

$$t_1 = C_1 \frac{V_z}{i} \quad (3)$$

When that voltage goes down to threshold level $V_{TH}$ of inverter $G_1$, the output (C) of inverter $G_1$ is inverted and assumes the H level (i.e. high level). (See FIG. 4, line (C)). As a result, output (A) and NAND gate $G_2$ assumes a low level L, and the voltage at the input end of inverter $G_1$ takes a value $e_1'$ identical to that given by equation (1), but opposite in polarity. Thereafter, discharge action of opposite polarity takes place linearly by means of constant value current limiting circuit $CC_1$. Subsequently, when threshold level $V_{TH}$ of inverter $G_1$ is attained, output (C) of inverter $G_1$ is inverted, as shown in FIG. 4, line (C). Since this discharge action of opposite polarity takes place also with current i of a certain value, discharge time $t_1'$ becomes identical to $t_1$, namely, $$t_1 = t_1' \quad (4)$$

The foregoing relationships are maintained even after counter $CT_1$ has counted a given number and the circuit has been switched to the side of capacitor $C_2$ by means of the output of counter $CT_1$. Thus, the following equation holds.

$$t_2 = C_2 \frac{V_z}{i} \quad (5)$$

Therefore, the H period of a pulse signal obtained from output $Q_n$ of counter $CT_1$ corresponds to capacitor $C_1$ and the L period to capacitor $C_2$. By averaging these periods using filter circuit $FC_1$ there is obtained a calculated result, $C_1/(C_1+C_2)$ related to the duty ratio of the pulse signal. This calcuated result gives a value proportional to the displacement of movable electrode 16, i.e. the differential pressure ($P_H$-$P_L$). In addition, distributed capacitance $C_s$ is eliminated.

For reference, the fixed capacitance $C_F$ existing across the capacitances $C_1$ and $C_2$ can be eliminated by connecting fixed condensers in parallel across circuit $CC_1$ and making their capacitances identical to those of the fixed capacitance $C_F$.

Further, to compensate for any error resulting from change of ambient temperature or static pressure on the sensor section, the conventional displacement transducer is equipped with an independent temperature sensor for measuring the temperature of body 10 and another independent pressure sensor for measuring the pressure, i.e. static pressure, of the sealing liquid 14. Specifically, the outputs of these sensors are applied to a compesation voltage generating circuit and converted thereby into a zero compensation temperature signal and a zero compensation span signal. These zero compensation signals are algebraically added to the output of an arithmetic circuit for adding and calculating the differential pressure ($P_H$-$P_L$), whereby a fluctuation of the zero point resulting from a fluctuation of temperature of static pressure is compensated.

In case a span fluctuation resulting from a fluctuation of temperature or static pressure is not negligible, a span compensation temperature signal and a span compensation pressure signal are generated by the foregoing compensation voltage generating circuit to change the voltage/current conversion gain of an output circuit and to thereby compensate for fluctuation of the span.

To perform such compensation, the temperature sensor and pressure sensor must be located inside body 10. A conventional system having a temperature sensor disposed inside a body is disclosed, for example, in Japan UM Laid Open No. 55-13317, and another conventional system having a pressure sensor disposed inside a body is disclosed, for example in Japan Laid Open No. 54-67480.

Although the transducer shown in FIGS. 1-3, is capable of eliminating adverse influences due to distributed capacitance $C_s$ and fixed capacitance $C_F$, disadvantageously, signals relating to the H time duration and the L time duration of the output of counter $CT_1$, which are proportional to the capacitances of capacitors $C_1$ and $C_2$, are determined depending upon the constant value current characteristics of limiting circuit $CC_1$. Thus, if the performance of constant value current limiting circuit $CC_1$ is degraded, errors are likely to be produced. For example, if circuit $CC_1$ is degraded and a degradation resistance $R_{cc}$ indicated by the dotted line in FIG. 3 is equivalently formed in the circuit, voltage changes $e_1$ and $e_2$ at the input end (B) of inverter $G_1$ arising when the circuit is switched over to the side of capacitor $C_1$ and to the side of capacitor $C_2$ become different from each other. Thus, current flowing through degradation resistor $R_{cc}$, while bypassing constant value current limiting circuit $CC_1$, differs between the side of capacitor $C_1$ and the side of capacitor $C_2$, and accordingly produces an error.

Furthermore, to eliminate fixed capacitance $C_F$, fixed condensers are inserted across either end of constant value current limiting circuit $CC_1$. However, practically, stray capacitances are also formed at either end of circuit $CC_1$. These capacitances change their capacitances in response to temperature variations. Thus, it is impossible to eliminate completely the fixed capacitance $C_F$ and therefore errors are produced due to non-linearity.

Moreover, disadvantageously, the conventional transducer includes a temperature sensor and a pressure sensor disposed in the body in order to compensate for errors caused by changes in ambient temperature and static pressure. Thus, the conventional configuration of the sensor section is complicated and expensive.

Thus, in the prior art, there is a need for an inexpensive, reliable and simple displacement type transducer which can compensate for changes in ambient temperature and static pressure.

SUMMARY OF THE INVENTION

Accordingly, an object of the invention is to overcome the aforementioned and other defects, deficiencies and disadvantages of the prior art.

Another object is to eliminate unwanted distributed and fixed capacitances by forming a discharge circuit without using complex circuitry, such as the constant value current limiting circuit; and to compensate for the zero point and span deviations due to changes of ambient temperature and static pressure by the use of information contained in a differential signal.

The foregoing and other objects are attined by the invention which encompasses a capacitive displacement transducer comprising a first capacitor and a second capacitor comprising first and second electrodes disposed opposite a movable electrode and having capacitances which change differentially in response to a physical displacement to be detected moving the movable electrode; amplifying means for detecting the potential of the movable electrode; negative feedback means for supplying an inverted current to the input end of the amplifying means; counting means for counting change of the output level of the amplifying means; integrating means for integrating the output of the counting means; first switch means for switching, by means of the output of the amplifying means and the output of the counting means, and for applying a voltage relating to the output of the integrating means and a reference voltage to the first capacitor; second switch means for switching, by means of the output of the amplifying means the output of the counting means, and for applying the voltage relating to the output of the integrating means and a source voltage to the second capacitor; and fixed capacitor correcting means for applying a voltage relating to the difference between the source and the voltage relating to the output of the integrating means to the movable electrode through a fixed resistor.

DETAILED DESCRIPTION OF PREFERRED EMBODIMENTS

Figure 1:
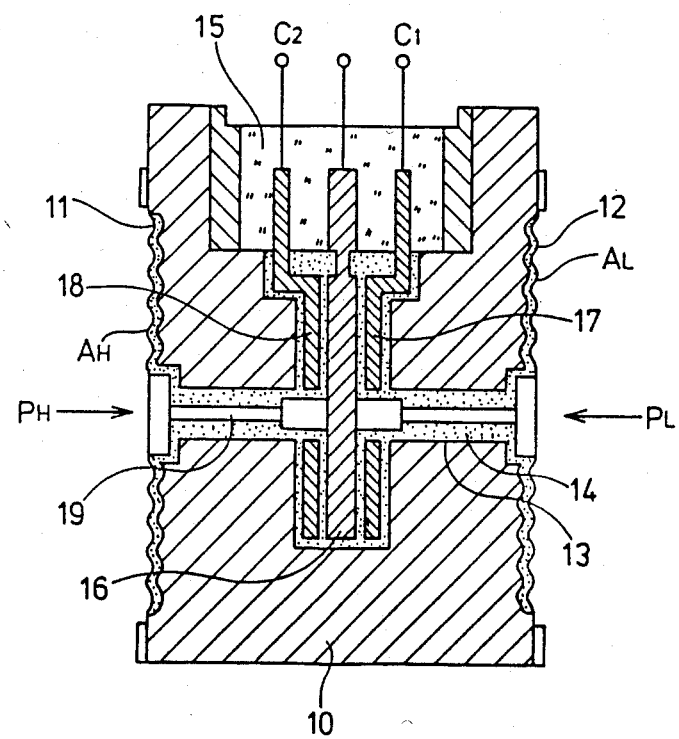
FIG. 1 is a sectional view depicting a sensor section of a conventional capacitive displacement transducer.
Figure 2:
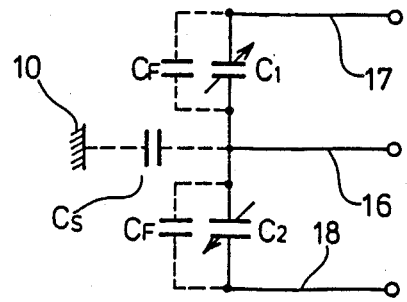
FIG. 2 is an electrical equivalent circuit of the circuit of FIG. 1.
Figure 3:
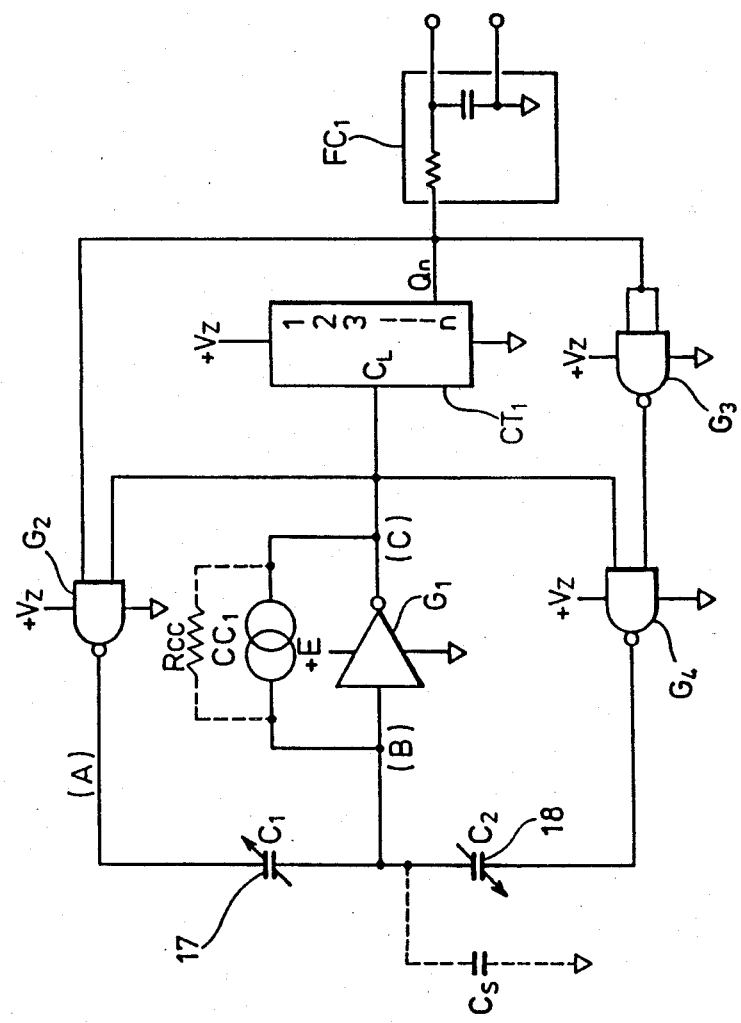
FIG. 3 is a circuit diagram depicting a displacement converting section combined with the sensor section of FIG. 1.
Figure 4:
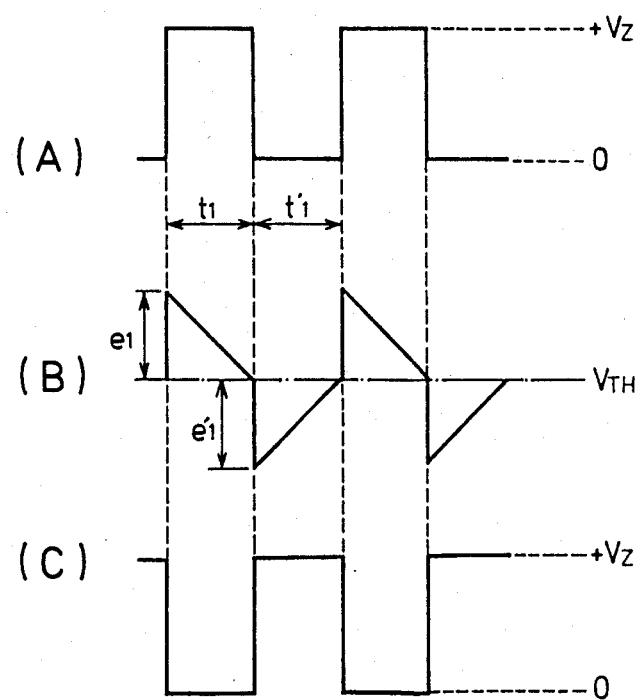
FIG. 4, comprising lines A,B,C, is a waveform diagram depicting waveforms appearing at different parts of the circuit of FIG. 3.

In the drawing similar parts have the same reference numerals and their description is omitted where appropriate for simplicity of description.

Figure 5:
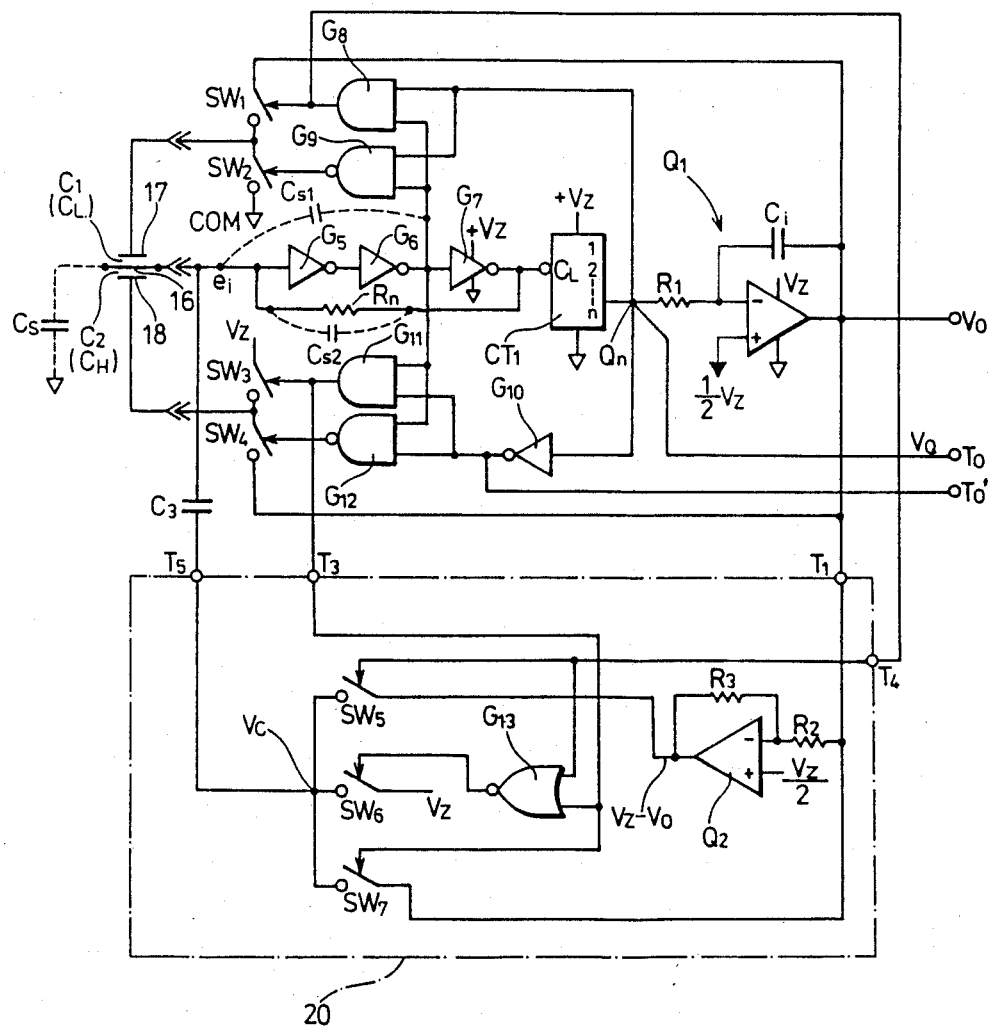
FIG. 5 is a circuit diagram depicting an illustrative embodiment of the invention.

Turning to FIG. 5, a movable electrode 16 is connected to an input end of an inverter $G_5$. The output end of inverter $G_5$ is connected to an input end of inverter $G_6$. Thus, a buffer gate is formed. The output end of inverter $G_6$ is connected through an inverter $G_7$ and a resistor $R_n$ to the input end of inverter $G_5$ in a negative feedback mode.

The output end of inverter $G_7$ is connected to an input end $C_L$ of an n-bit counter $CT_1$. The output end $Q_n$ of counter $C_L$ is connected to (1) an input end of AND gate $G_8$, (2) an input end of NAND gate $G_9$, and (3) to a terminal $T_o$. The other input end of AND gate $G_8$ and the other input end of NAND gate $G_9$ are connected to an output end of inverter $G_6$.

The output end of inverter $G_{10}$ is connected to (1) an input end of AND gate $G_{11}$, (2) an input end of NAND gate $G_{12}$, and (3) to a terminal $T_o'$. The other input end of AND gate $G_{11}$ and the other input end of NAND gate $G_{12}$ are connected to the output end of inverter $G_6$.

Output end $Q_n$ of counter $CT_1$ is also connected to an input end of integrator $Q_1$. Integrator $Q_1$ includes a resistor $R_1$ connected between the inverting input end (−) of an operational amplifier and output end $Q_n$ of counter $CT_1$ and a condenser $C_i$ connected between the inverting input end (−) of the operational amplifier and its output end. The non-inverting input end (+) of the operational amplifier is connected to a ½ potential point (a midway potential point) having a potential equal to one-half of a source voltage V.

Switches $SW_1$ and $SW_2$ are connected mutually in series, and their connection point is connected to a fixed electrode 17. The other end of switch $SW_1$ is connected to the output end of integrator $Q_1$. The other end of switch $SW_2$ is connected to a common potential point COM. These switches $SW_1$ and $SW_2$ are controlled, or opened and closed, by means of the outputs of AND gate $G_8$ and NAND gate $G_9$.

Switches $SW_3$ and $SW_4$ are connected mutually in series, and their connection point is connected to a fixed electrode 18. To the other end of switch $SW_3$ is applied source voltage $V_z$. The other end of switch $SW_4$ is connected to the output end of integrator $Q_1$. These switches $SW_3$ and $SW_4$ are controlled, or opened and closed, by means of the outputs of AND gate $G_{11}$ and NAND gate $G_{12}$.

A fixed capacitance correcting circuit 20 is provided for correcting fixed capacitances $C_F$ existing across the respective ends of capacitance $C_1$ and capacitance $C_2$. To the inverting input end (−) of an arithmetic unit $Q_2$ is applied a variable voltage $V_o$ at the output end of integrator $Q_1$ through a terminal $T_1$ and a resistor $R_2$. A resistor $R_3$ is connected between the inverting input end (−) and the output end of the arithmetic unit $Q_2$. To the non-inverting input end (+) of unit $Q_2$, is applied a voltage equal to one-half of the source voltage $V_z$, so that arithmetic unit $Q_2$ provides at its output end a voltage equal to $(V_z-V_o)$.

Switches $SW_5$, $SW_6$ and $SW_7$ are connected together at their respective one ends, and compensation voltage $V_c$ appearing at these one ends connected together is applied through a terminal $T_5$ and a compensation capacitance $C_3$ to movable electrode 16.

The other end of switch $SW_5$ is connected to the output end of arithmetic unit $Q_2$. To the other ends of switches $SW_6$ and $SW_7$ are applied, respectively, source voltage $V_z$ and variable voltage $V_o$. Switch $SW_5$ is controlled, or opened and closed, by means of the voltage at the output end of AND gate $G_8$ applied through a terminal $T_4$. Switch $SW_6$ is controlled, or opened and closed, by means of the voltage at the output end of a NOR gate $G_{13}$. Voltage at the output end of AND gate $G_{11}$ is applied through a terminal $T_3$, to an input end of NOR gate $G_{13}$. The voltage at the output end of AND gate $G_8$ is applied through terminal $T_4$ to the other input end of NOR gate $G_{13}$. Switch $SW_7$ is controlled, or opened and closed, by means of voltage at the output end of the AND gate $G_{11}$ applied through the terminal $T_3$.

The operation of the circuit shown in FIG. 5 will now be described with reference to FIGS. 6, 7A, 7B, 7C, 7D, 8A, 8B, 8C, 8D, and ignoring the fixed capacitance correcting circuit 20.

Figure 6:
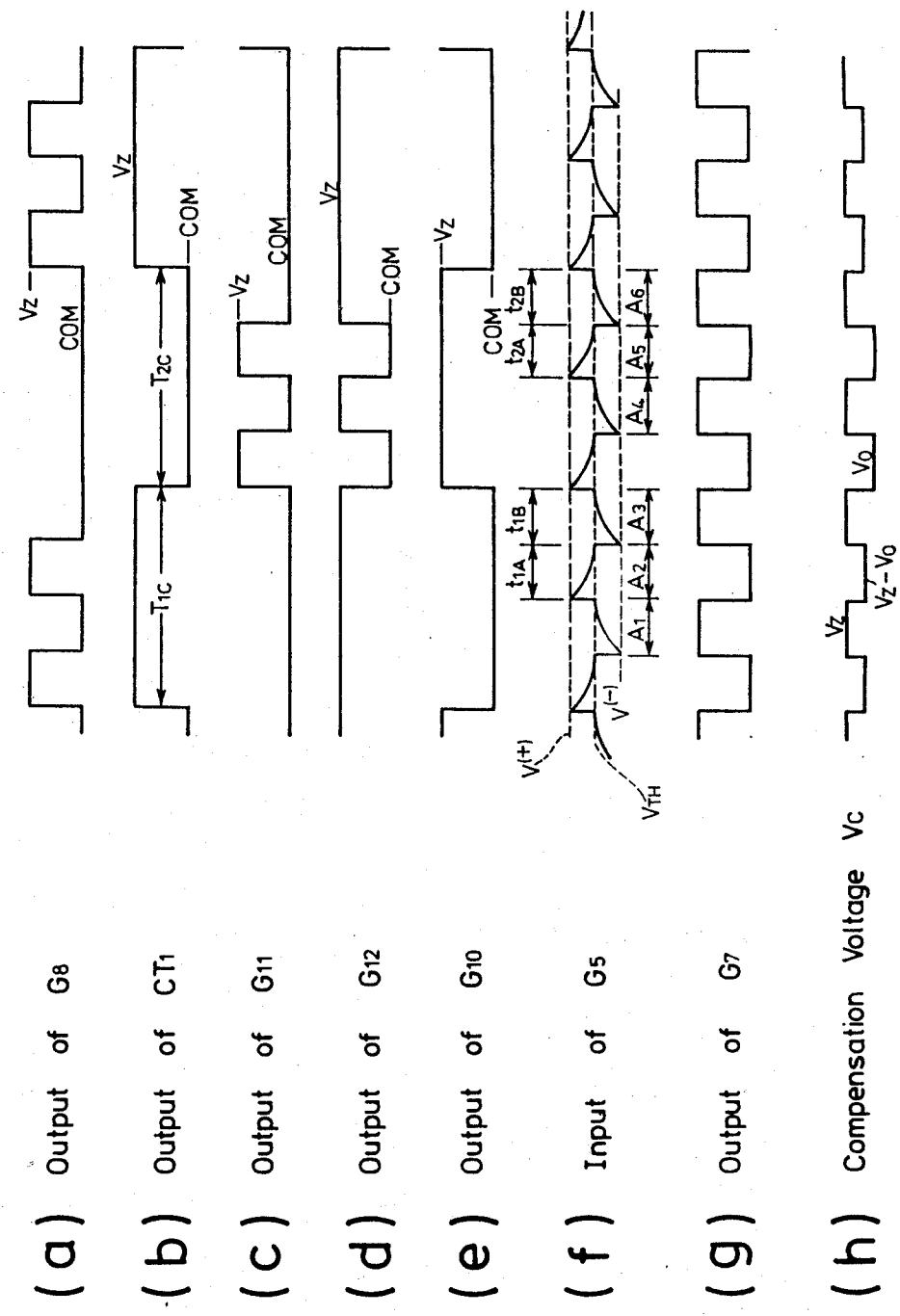
FIG. 6, comprising lines A through H, is a waveform diagram depicting waveforms appearing at different parts of the circuit of FIG. 5.
Figure 7:
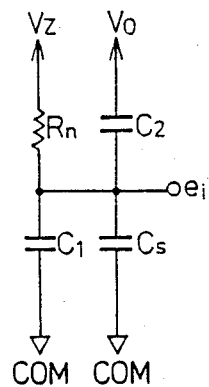
FIGS. 7A, 7B, 7C, 7D, are equivalent circuit diagrams of the switch of FIG. 5 depicting different switched states.
Figure 7:
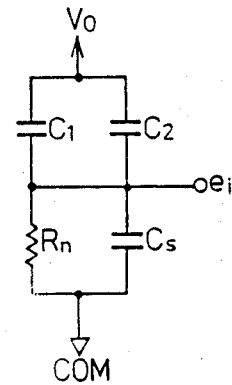
Figure 7:
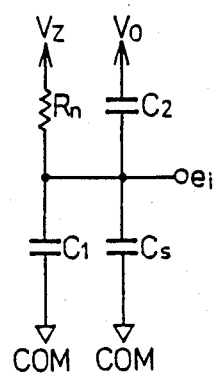
Figure 7:
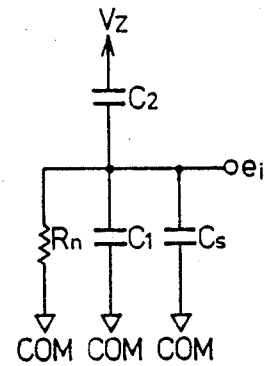

When the output of counter $CT_1$ is at a high level H, as indicated at period $T_{1c}$ in FIG. 6, line B, and the output of inverter $G_6$ is at a low level L, the output (see FIG. 6, line A) of AND gate $G_8$ is in the L state and the circuit connection is in the state shown in FIG. 7A, so that the voltage $e_i$ at the input end of inverter $G_5$ is in the state indicated by $A_1$ in FIG. 6, line F. Thus, the capacitances $C_1$ and $C_2$ and a distributed capacitance $C_s$ are charged through inverter $G_7$ and resistor $R_n$, to gradually raise their potentials. When voltage $e_i$ reaches threshold level $V_{TH}$ of inverter $G_7$, the output of inverter $G_6$ is inverted and the circuit connection becomes that shown in FIG. 7B. Thus, voltage $e_i$ at the input end of inverter $G_5$ assumes the state shown by $A_2$ in FIG. 6, line F.

Under the foregoing condition, the output of inverter $G_{10}$ is in the state shown in FIG. 6, line E, wherein the output of counter $CT_1$ has been inverted. Thus, both the output (see FIG. 6, line C) of AND gate $G_{11}$ and the output (see FIG. 6, line D) of NAND gate $G_{12}$ do not change, but, the side of capacitance $C_1$ only is switches over.

If the circuit parameters are set so that the total quantity (see FIG. 7A) of charge of the respective capacitances existing when voltage $e_i$ at the input end of inverter $G_5$ (being in the state indicated by $A_1$ in FIG. 6, line F) has reached threshold $V_{TH}$ is equal to the total quantity (see FIG. 7B) of charge existing immediately after that voltage has shifted to the state $A_2$, a voltage $V_1^{(+)}$ immediately after inversion is given by the following.

$$V_1^{(+)} = V_{TH} + \frac{C_1}{C_1 + C_2 + C_s} V_o$$

The transient state occurring after switchover from state $A_1$ to state $A_2$ results in the circuit connection shown in FIG. 7B. Taking the above $V_1^{(+)}$ as the initial value, a discharge time $t_{1A}$ during which the voltage $e_i$ goes down to the threshold level $V_{TH}$, is calculated as follows.

$$t_{1A} = R_n(C_1 + C_2 + C_s)\ln \times \left(1 + \frac{C_1}{C_1 + C_2 + C_s} \cdot \frac{V_o}{V_{TH}}\right) \quad (6)$$

After the discharge time $t_{1A}$ has elapsed the output of inverter $G_6$ is inverted. A voltage $V_1^{(-)}$ at the input end of inverter $G_5$ immediately after the circuit connection has assumed the state shown in FIG. 7A (which corresponds to state $A_3$ of FIG. 6, line F) is given, similarly to voltage $V_1^{(+)}$ by the following.

$$V_1^{(-)} = V_{TH} - \frac{C_1}{C_1 + C_2 + C_s} V_o$$

The transient state occurring after switchover from state $A_2$ to state $A_3$ results in the circuit connection shown in FIG. 7A. Taking the above $V_1^{(-)}$ as the initial value, a charge time $t_{1B}$, when the voltage $e_i$ goes down to the threshold level $V_{TH}$, is calculated as follows.

$$t_{1B} = R_n(C_1 + C_2 + C_s)\ln \times \quad (7)$$

-continued $$\left(1 + \frac{C_1}{C_1 + C_2 + C_s} \cdot \frac{V_o}{V_z - V_{TH}}\right)$$

Thus, when the output of counter $CT_1$ is at a low level L as indicated in period $T_{2c}$ of FIG. 6, line B, and the output of inverter $G_6$ is at low level L, the circuit connection is that shown in FIG. 7C, so that voltage $e_i$ at the input end of inverter $G_5$ is in the state indicated by $A_4$ in FIG. 6, line F. Thus, the capacitors $C_1$ and $C_2$ and distributed capacitance $C_s$ are charged through inverter $G_7$ and resistor $R_n$ to gradually raise their potentials. When voltage $e_i$ reaches threshold level $V_{TH}$ of inverter $G_7$, the output of inverter $G_6$ is inverted and the circuit connection assumes the state shown in FIG. 7D. Thus, voltage $e_i$ assumes the state indicated by $A_5$ in FIG. 6, line F. Discharging continues during discharging time $t_{2A}$ of state $A_5$. When threshold level $V_{TH}$ is attached, the output of inverter $G_6$ is inverted and the respective capacitances are charged during a charge time $t_{2B}$ of state $A_6$ shown in FIG. 6, line F.

During period $T_{1c}$ the potential of fixed electrode 18 of capacitance $C_s$ goes down to variable voltage $V_o$. On the other hand, during period $T_{2c}$, the potential of fixed electrode 17 of capacitance $C_1$ goes down to that of common potential point COM.

A voltage $V_2^{(+)}$ immediately after reversal from state $A_4$ to state $A_5$ is given, similarly to the case of the period $T_{1c}$, by the following.

$$V_3^{(+)} = V_{TH} + \frac{C_2}{C_1 + C_2 + C_s}(V_z - V_o)$$

The discharge time $t_{2A}$ in state $A_5$ is calculated by the use of the foregoing initial value, similarly to the case of equation (6), as follows.

$$t_{2A} = R_n(C_1 + C_2 + C_s)\ln \times \qquad (8)$$

$$\left(1 + \frac{C_2}{C_1 + C_2 + C_s} \cdot \frac{V_z - V_o}{V_{TH}}\right)$$

A voltage $V_2^{(-)}$ immediately after reversal from state $A_5$ to state $A_6$ is given, similarly to the case of period $T_{1c}$, by the following.

$$V_2^{(-)} = V_{TH} - \frac{C_2}{C_1 + C_2 + C_s}(V_z - V_o)$$

Discharge time $t_{2B}$ in state $A_6$ is calculated by the use of the initial value, similarly to the case of equation (7), as follows.

$$t_{2B} = R_n(C_1 + C_2 + C_s)\ln \times \qquad (9)$$

$$\left(1 + \frac{C_2}{C_1 + C_2 + C_s} \cdot \frac{V_z - V_o}{V_z - V_{TH}}\right)$$

Here, the integrator $Q_1$ regulates the variable voltage $V_o$ so that the output (see FIG. 6, line B) of counters $CT_1$ becomes identical between period $T_{1c}$ and period $T_{2c}$. This satisfies the following equilibrium condition.

$$t_{1A} + t_{1B} = t_{2A} + t_{2B} \qquad (10)$$

The potential $V_o$ is obtained by substituting equation (6) through (9) for equation (10) as follows.

$$V_o = \frac{C_2}{C_1 + C_2} V_z \qquad (11)$$

If $C_o$ is taken as the capacitance when a differential pressure $\Delta P$ is zero and k is a constant, the capacitance $C_1$ and $C_2$ are represented by the following.

$$C_1 = C_o \frac{1}{1 - k\Delta P} \qquad (12)$$

$$C_2 = C_o \frac{1}{1 + k\Delta P} \qquad (13)$$

By substituting these equations (12) and (13) for equation (11), the following is obtained.

$$V_o = \frac{1}{2}(1 + k\Delta P)V_z \qquad (14)$$

That is, variable voltage $V_o$ is proportional to differential pressure $\Delta P$.

Equation (14) does not include distributed capacitance $C_s$ which is eliminated during calculation of equation (10). Thus, no influence due to distributed capacitance $C_s$ appears in the results.

The operation of the circuit in case the fixed capacitance correcting circuit 20 (see FIG. 5) is effectively included will now be described. Practically, the fixed capacitances $C_F$, which are non-responsive to differential pressure $\Delta P$, are formed across capacitances $C_1$ and $C_2$. Capacitances $C_H$ and $C_L$ corresponding to cpacitances $C_1$ and $C_2$, which must be considered if fixed capacitances $C_F$ are taken into account, are given as follows.

$$C_L = C_1 + C_F = C_o \frac{1}{1 - k\Delta P} + C_F \qquad (15)$$

$$C_H = C_2 + C_F = C_o \frac{1}{1 + k\Delta P} + C_F \qquad (16)$$

The fixed capacitances $C_F$ increase their ratio of capacitance to the other capacitances when the sensor section is miniaturized and correspondingly, possibility of occurrence of non-linearity also inreases. Thus, the fixed capacitance correcting circuit 20 is used to eliminate fixed capacitances $C_F$.

Figure 8:
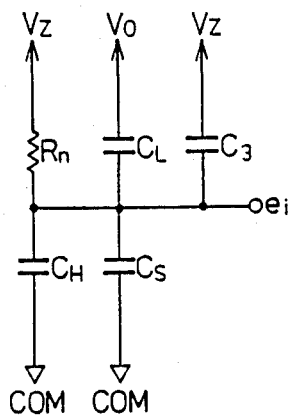
FIGS. 8A, 8B, 8C, 8D, are equivalent circuit diagrams of the switch of FIG. 5 having a compensation capacitance added thereto and depicting different switched states.
Figure 8:
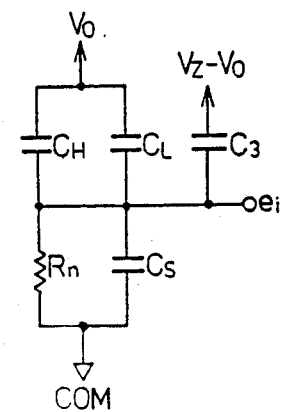
Figure 8:
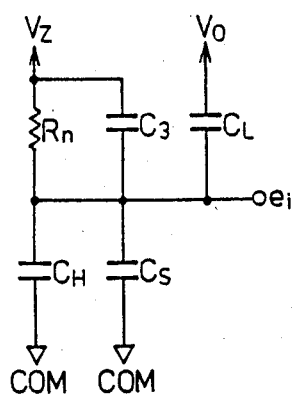
Figure 8:
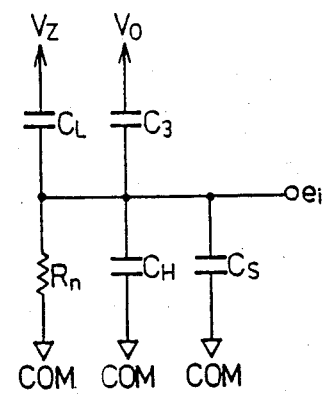

When the output of counter $CT_1$ is at H level, as indicated by period $T_{1c}$ in FIG. 6, line B, the output of AND gate $G_{11}$ is at L level, as shown in FIG. 6, line C, not depending upon the output level of inverter $G_6$. Thus, switch $SW_7$ is kept open. In this state, when the output of inverter $G_6$ is L, switches $SW_1$ and $SW_5$ are OFF, and switches $SW_2$ and $SW_6$ are ON. The circuit connection in this condition is as shwon in FIG. 8A. Then, when the output of inverter $G_6$ becomes H, switches $SW_1$ and $SW_5$ turn ON and switches $SW_2$ and $SW_6$ are turned OFF. The circuit connection in this condition is as shown in FIG. 8B. The state of compensation voltage $V_c$, under the above condition, is as shown in FIG. 6, line H.

When the output of counter $CT_1$ is at the L level, as indicated by period $T_{2c}$ in FIG. 6, line B, the output of AND gate $G_8$ is at the L level, as shown in FIG. 6, line A, not depending upon the output level of inverter $G_6$. Thus, switch $SW_5$ is kept open. In this case, switches SW$_6$ and SW$_7$ operate in mutually opposite phases. In this condition, when the output of inverter G$_6$ is L, switches SW$_3$ and SW$_7$ are turned OFF, and switches SW$_4$ and SW$_6$ are turned ON. The circuit connection in this case is shown in FIG. 8C. Then, when the output of inverter G$_6$ becomes H, switches SW$_3$ and SW$_7$ are turned ON and switches SW$_4$ and SW$_6$ are turned OFF. The circuit connection in this case is shown in FIG. 8A. The state of compensation voltage V$_c$, under the above condition, is shown in FIG. 6, line H.

From comparison of the circuit connection shown in FIGS. 7A–7D and 8A–8D, it is clear that both circuit configurations become completely identical mutually if C$_1$ and C$_2$ of FIGS. 7A–7D are read substitutively as C$_L$ and C$_H$, respectively, and if compensation capacity C$_3$ is ignored. That is, the circuits shown in FIGS. 8A–8D are identical in configuration to those of FIGS. 7A–7D with compensation capacitor C$_3$ added thereto. Accordingly, the calculation procedure used with respect to FIGS. 7A–7D is substantially applicable to FIGS. 8A–8D, as follows.

The charge and discharge times, t$_{1A}'$, t$_{1B}'$, t$_{2A}'$, and t$_{2B}'$ when fixed capacity correcting circuit 20 is included, corresponding to the discharge time t$_{1A}$, charge time t$_{1B}$, discharge time t$_{2A}$, a and charge time t$_{2B}$, respectively, when fixed capacitance correcting circuit 20 is not added, are given as follows.

$$t_{1A}' = R_n(C_H + C_L + C_3 + C_s)\ln \times \left(1 + \frac{C_L - C_3}{C_H + C_L + C_3 + C_s} \cdot \frac{V_o}{V_{TH}}\right) \quad (17)$$

$$t_{1B}' = R_n(C_H + C_L + C_3 + C_s)\ln \times \left(1 + \frac{C_L - C_3}{C_H + C_L + C_3 + C_s} \cdot \frac{V_o}{V_z - V_{TH}}\right) \quad (18)$$

$$t_{2A}' = R_n(C_H + C_L + C_3 + C_s)\ln \times \left(1 + \frac{C_H - C_3}{C_H + C_L + C_3 + C_s} \cdot \frac{V_z - V_o}{V_{TH}}\right) \quad (19)$$

$$t_{2B}' = R_n(C_H + C_L + C_3 + C_s)\ln \times \left(1 + \frac{C_H - C_3}{C_H + C_L + C_3 + C_s} \cdot \frac{V_z - V_o}{V_z - V_{TH}}\right) \quad (20)$$

In the equilibrium state, the following holds.

$$t_{1A}' + t_{1B}' = t_{2A}' + t_{2B}' \quad (21)$$

Thus, by substituting equations (17) through (20) for equation (21) the following is obtained.

$$V_o = \frac{C_H - C_3}{C_H + C_L - 2C_3} V_z \quad (22)$$

By substituting equations (15) and (16) for equation (22), the following is obtained.

$$V_0 = \frac{C_o + \frac{1}{1 + k\Delta P} + C_F - C_3}{C_o \frac{1}{1 - k\Delta P} + C_o \frac{1}{1 + k\Delta P} + 2C_F - 2C_3} V_z \quad (23)$$

By setting C$_F$=C$_3$, the following is obtained.

$$V_o = \frac{1}{2}(1 - k\Delta P)V_z \quad (24)$$

That is, there is obtained a linearly variable output proportional to differential pressure $\Delta P$, not influenced by either distributed capacitance C$_s$ or fixed capacitances C$_F$. Although there exist stray capacitances C$_{s1}$ and C$_{s2}$ between the output ends of inverters G$_6$ and G$_7$ and the input end of inverter G$_5$, these stray capacitances appear in a common mode between C$_H$ side and the C$_1$ side. Thus, they are eliminated in the equilibrium state.

As will be apparent from consideration of equation (24) which is obtained from equation (23), the output exhibits a non-linear change with respect to differential pressure $\Delta P$ if fixed capacitances C$_F$ are not eliminated completely. Further, it is sometimes desired to correct non-linearity ranging positively and negatively by additionally taking into account non-linearity caused by a spring system of the sensor system, and the like.

Figure 9:
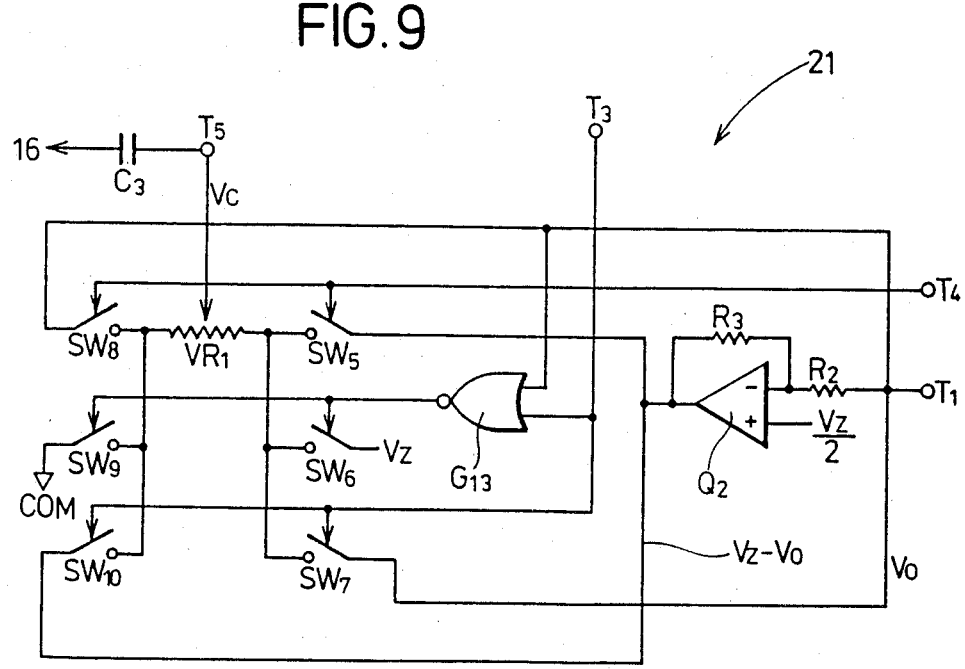
FIG. 9 is a circuit diagram depicting a fixed capacitance correcting circuit capable of correcting non-linearity ranging positively and negatively.

FIG. 9 depicts an illustrative fixed capacity correcting circuit which is capable of additionally correcting non-linearity which may range positive and negative. Fixed capacity correcting circuit 21 is a modification of fixed capacity correcting circuit 20 (of FIG. 5) to which switches SW$_8$, SW$_9$ and SW$_{10}$ and a variable resistor VR$_1$, are added. One end of switch SW$_8$ is connected through variable resistor VR$_1$ to one end of each of switches SW$_5$, SW$_6$, and SW$_7$ and directly to one end of each of switches SW$_9$ and SW$_{10}$, as depicted. To the other end of switch SW$_8$ is applied variable voltage V$_o$. To the other end of switch SW$_9$ is applied common potential point COM. To the other end of switch SW$_{10}$ is applied output voltage (V$_z$-V$_o$) of arithmetic unit Q$_2$. Switches SW$_8$ and SW$_5$ are switched concurrently, similarly to switches SW$_9$ and SW$_6$ and to switches SW$_{10}$ and SW$_7$.

Thus, to variable resistor VR$_1$ are applied coutput voltage (V$_z$-V$_o$) of unit Q$_2$ and variable voltage V$_o$ (which is opposite in phase to V$_z$-V$_o$) by means of switches SW$_5$ and SW$_8$. Accordingly, a desired variable voltage, ranging between the foregoing two voltages, is applied via an intermediate point of resistor VR$_1$ to compensation capacitor C$_3$. Alternatively, by means of switches SW$_6$ and SW$_9$, a desired fixed voltage, ranging between voltage V$_z$ and the potential of common potential point COM, is applied via the intermediate point of resistor VR$_1$ to compensation capacitance C$_3$. Further, alternatively, by means of switches SW$_7$ and SW$_{10}$ a variable voltage ranging between variable voltage V$_o$ and output voltage (V$_z$-V$_o$) of unit Q$_2$ is applied via the intermediate point of resistor VR$_1$ to capacitance C$_3$. Thus, in each case, a desired variable of fixed voltage is applied via the intermediate point of resistor VR$_1$ to capacitor C$_3$. By the foregoing configuration, the magnitude of compensation voltage V$_c$ is adjusted to perform compensation of non-linearity.

Figure 10:
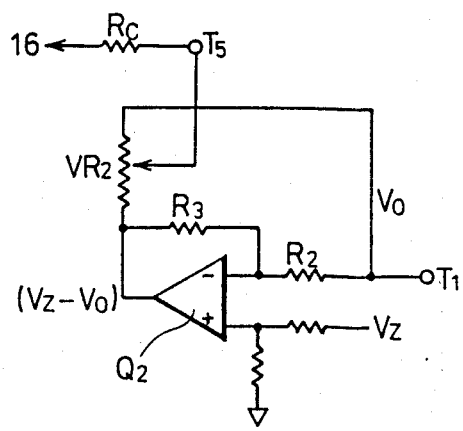
FIG. 10 is a circuit diagram depicting a fixed capacitance correcting circuit which corrects non-linearity by use of an analog circuit.

FIG. 10 depicts another illustrative circuit for compensating for non-linearity using an analog circuit, wherein a variable resistor VR$_2$ is connected between terminal T$_1$ and the output end of arithmetic unit Q$_2$. The intermediate point of resistor VR$_2$ is connected through terminal T$_5$ and a compensation resistor R$_c$, to movable electrode 16. A desired variable voltage ranging between variable voltage V$_o$ and output voltage (V$_z$-V$_o$) of arithmetic unit Q$_2$ is obtained at the intermediate point of variable resistor VR$_2$, by which the overall non-linearity is corrected or compensated.

Figure 11:
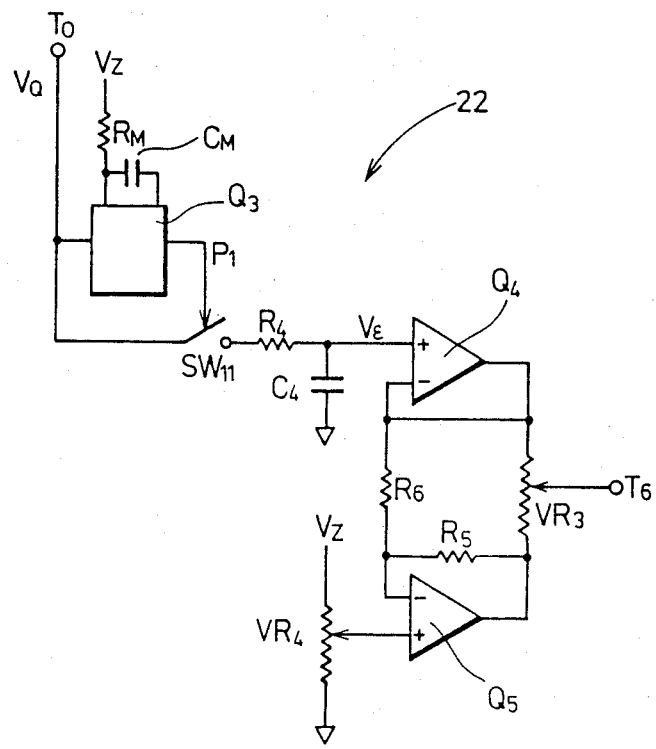
FIG. 11 is a circuit diagram depicting a zero correcting circuit for correcting deviation of the zero point resulting from change of temperature or static pressure.

FIG. 11 depicts an illustrative zero point correcting circuit 22 for correcting deviations of the zero point of the sensor section resulting from changes of temperature or static pressure. In this connection, let $A_H$ be the effective area of diaphragm 11 on the high pressure side and $A_L$ be the effective area of diaphragm 12 on the low pressure side, as shown in FIG. 1. If the transducer is configured so as to provide the relationship $A_H > A_L$, for example, volume v of the sealing liquid increases in response to temperature change $\Delta T$ and rod 19 is moved to the left. On the other hand, the volume v of the sealing liquid decreases due to static pressure change $\Delta P_s$ and rod 19 is moved to the right. As a result, the zero point fluctuates or deviates. In case $A_H < A_L$, the foregoing relationships are reversed. That is, it is known that the direction of occurrence of zero point fluctuation caused by the difference of effective areas becomes opposite between a temperature rise and a static pressure rise. This zero point fluctuation is produced as a result of change of internal pressure caused by a change of volume or a change of density of the sealing liquid.

In connection with the relationships between the rate of volume change of the sealing liquid due to temperature change and static pressure change, and the rate of change of permittivity $\epsilon$ of the sealing liquid due to temperature change and static pressure change, the following relationships were found.

$$\frac{1}{V} \cdot \frac{\Delta V}{\Delta T} \approx -\frac{1}{1.28\epsilon} \cdot \frac{\Delta \epsilon}{\Delta T} \quad (25)$$

$$\frac{1}{V} \cdot \frac{\Delta V}{\Delta P_s} \approx -\frac{1}{1.30\epsilon} \cdot \frac{\Delta \epsilon}{\Delta T} \quad (26)$$

The foregoing relationships show that the rate of change of permittivity $\epsilon$ of the sealing liquid due to changes of ambient temperature and static pressure is substantially identical to the rate of volume change of the sealing liquid due to the changes of ambient temperature and static pressure. Also from equations (25) and (26) it can be seen that volume change $\Delta V$ resulting from change of temperature or static pressure can be detected by detecting the rate of change $\Delta \epsilon$ of permittivity $\epsilon$. Since a zero point fluctuation occurs when there appears a difference of effective area caused by volume change of the sealing liquid, it is possible to compensate for fluctuation of the zero point on the basis of a detection signal generated by detecting change of $\Delta \epsilon$ of permittivity $\epsilon$.

The procedure for deriving a signal relating to permittivity $\epsilon$ from the illustrative circuit of FIG. 5 will now be described.

From equations (6) through (9) is derived period $T_{1c}$ with setting $V_{TH} = V_z/2$. The following equation is obtained by letting $T_{1c} = t_{1A} = t_{1B}$.

$$T_{1C} = 2R_n(C_1 + C_2 + C_s)\ln \times$$

$$\left(1 + \frac{C_1}{C_1 + C_2 + C_s} \cdot \frac{2V_o}{V_z}\right) \approx 2R_n(C_1 + C_2 + C_s)\ln \times$$

$$\left\{\frac{C_1}{C_1 + C_2 + C_s} \cdot \frac{2V_o}{V_z} - \frac{1}{2}\left(\frac{C_1}{C_1 + C_2 + C_s}\right.\right.$$

-continued $$\left.\left.\frac{2V_o}{V_z}\right)^2 + \cdots \right\}$$

By omitting the terms of second degree and higher, it becomes as follows.

$$T_{1C} \approx 4R_n C_1 \frac{V_o}{V_z} \quad (27)$$

By letting $T_{2C} = t_{2A} + t_{2B}$, similarly, the following is obtained.

$$T_{2C} \approx 4R_n C_2 \frac{V_z - V_o}{V_z} \quad (28)$$

Since the circuit shown in FIG. 5 becomes balanced when $T_{1C} = T_{2C}$ as described above, the following is obtained from equations (27) and (28).

$$V_o = \frac{C_2}{C_1 + C_2} V_z$$

By substituting this equation for equation (27), the followins obtained.

$$T_{1C} = T_{2C} = 4R_n \frac{C_1 C_2}{C_1 + C_2} \quad (29)$$

By letting $C_v$ be a capacitance under vacuum when the differential pressure $\Delta P$ is zero, the relation $C_o = \epsilon C_v$ is obtained. By substituting this for equations (12) and (13) and the results thereof for equation (29), the following is obtained.

$$T_{1C} = 4R_n \frac{\frac{C_v \epsilon}{1 - k\Delta P} \cdot \frac{C_v \epsilon}{1 + k\Delta P}}{\frac{C_v \epsilon}{1 - k\Delta P} + \frac{C_v \epsilon}{1 + k\Delta P}} = 2R_n C_v \epsilon$$

By letting A be a proportional constant, the following is obtained.

$$T_{1C} = A\epsilon \quad (30)$$

Accordingly, the pulse duration of output signal $V_Q$ of counter $CT_1$ is proportional to permittivity $\epsilon$, which is obtained at terminal $T_o$.

In FIG. 11, a monostable circuit $Q_3$ produces a pulse signal $P_1$ having a predetermined pulse duration $T_K$ in response to output signal $V_Q$ applied to terminal $T_o$. A resistor $R_M$ and a capacitance $C_M$ are set so that pulse duration $T_K$ becomes larger than pulse duration $T_{1C}$ of the output signal $V_Q$ (i.e. $T_K > T_{1C}$) By opening and closing a switch $SW_{11}$, by means of pulse signal $P_1$, a voltage $V_\epsilon$ proportional to permittivity $\epsilon$ of the filled sealing liquid is obtained at the output end of a filter made of a resistor $R_4$ and a capacitor $C_4$ inserted between the output end of switch $SW_{11}$ and the non-inverting input end (+) of amplifier $Q_4$.

Figure 12:
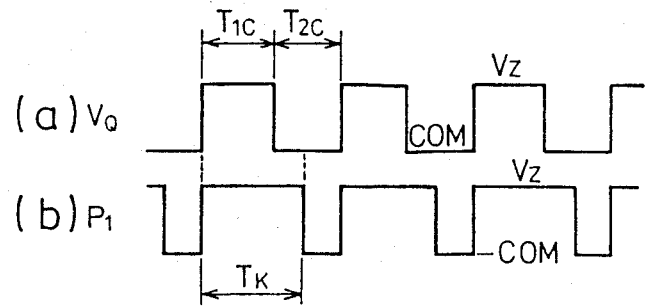
FIG. 12, comprising lines A,B, is a waveform diagram depicting waveforms appearing at different parts of the circuit of FIG. 11.

Taking into consideration output signal $V_Q$ and pulse signal $P_1$ shown in FIG. 12, lines A,B, voltage $V_\epsilon$ obtained at the non-inverting input end (+) of amplifier $Q_4$ has a form obtained by dividing output signal $V_Q$ by pulse signal P₁. Thus, by using equation (30), voltage $V_\epsilon$ becomes as follows.

$$V_\epsilon = \frac{T_{1C}}{T_K} V_z = \frac{A\epsilon}{T_K} V_z \quad (31)$$

Accordingly, there is obtained at the non-inverting end (+) of amplifier Q₄ voltage $V_\epsilon$ relating to zero point fluctuation of the sensor section, caused by changes of temperature and static pressure, which can be used as a compensation signal for compensating the zero point. A zero point adjusting circuit for correcting the zero point comprises an amplifier Q₅, a resistor R₅ connected between the input end and the output end of amplifier Q₅, a variable resistor VR₃ connected between the output end of amplifier Q₄ and the output end of amplifier Q₅, a resistor R₆ interposed between the inverting input end (−) of amplifier Q₅, and a variable resistor VR₄ having one end thereof receive voltage $V_z$ and a variable terminal connected to the non-inverting input end (+) of amplifier Q₅. By adjusting variable resistor VR₄ there is obtained at output terminal T₆ of the zero adjusting circuit, a fixed voltage for correcting the zero point to which voltage $V_\epsilon$ is added. The voltage obtained at terminal T₆ is added to variable voltage $V_o$, so that the resultant voltage serves as the compensation voltage for the zero point.

Although in FIG. 11, terminal T₀ is connected to the output end of counter CT₁ (of FIG. 5) to obtain output voltage $V_Q$, the invention is not limited thereto and can use any part of the circuit which generates an identical signal. For example, that signal may be obtained from the output end of inverter G₁₀ of FIG. 5.

Figure 13:
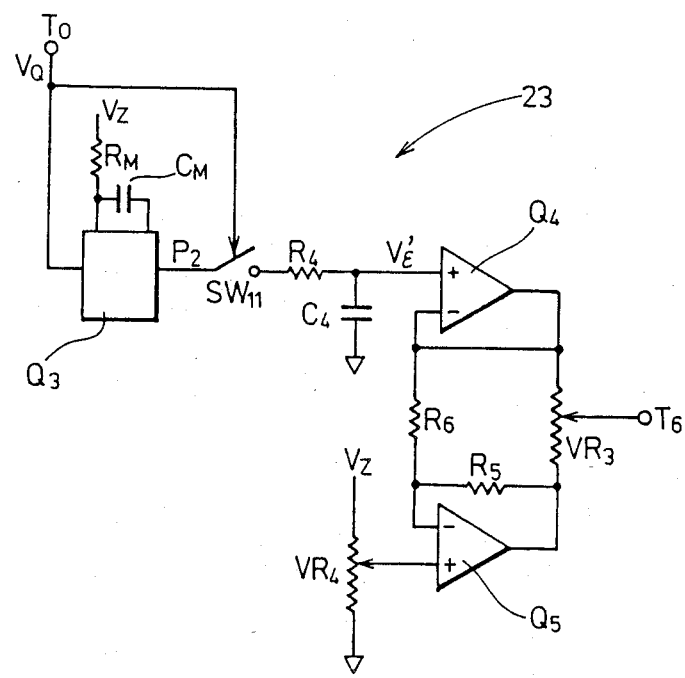
FIG. 13 is a circuit diagram depicting a zero correcting circuit wherein the relationship of pulse duration is set at $T_K' < T_{1c}$.

FIG. 13 depicts another illustrative zero point correcting circuit 23 wherein the relationship of pulse duration is set at $T_K' < T_{1C}$. The FIG. 13 circuit differs from the FIG. 11 circuit in that switch SW₁₁ is controlled by means of output signal $V_Q$ of counter CT₁, and the output end of the monostable circuit Q₃ is connected to the input end of switch SW₁₁ so that a pulse signal P₂ is applied thereto.

Figure 14:
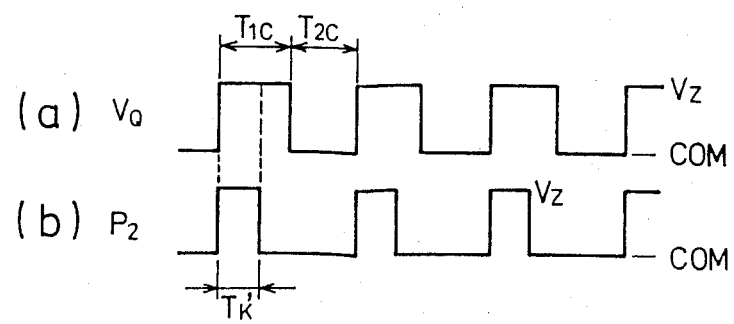
FIG. 14, comprising lines A,B, is a waveform diagram depicting waveforms appearing at different parts of the circuit of FIG. 13.

FIG. 14. lines A and B show waveforms of output signal $V_Q$ and pulse signal P₂ at different parts of the FIG. 13 circuit. Since switch SW₁₁ is opened and closed by means of output signal $V_Q$, calculation of $T_K'$ and $T_{1C}$ is inverse to the case of FIG. 11. Thus, voltage $V_\epsilon'$ becomes as follows.

$$V_\epsilon' = \frac{T_K'}{T_{1C}} V_z = \frac{T_K}{A\epsilon} V_z \quad (32)$$

In case the extent of change of permittivity $\epsilon$ is small, $1/\epsilon$ also varies linearly with change of static pressure and temperature. Thus, the inverse permittivity signal can be used as a compensation signal.

Figure 15:
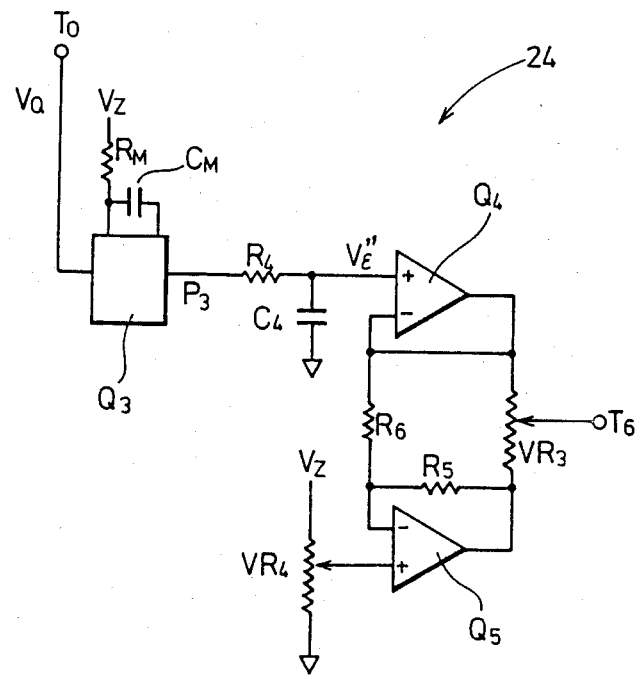
FIG. 15 is a circuit diagram depicting a zero correcting circuit wherein the relationship of pulse duration is set at $T_K'' \approx T_{1c}$.
Figure 16:
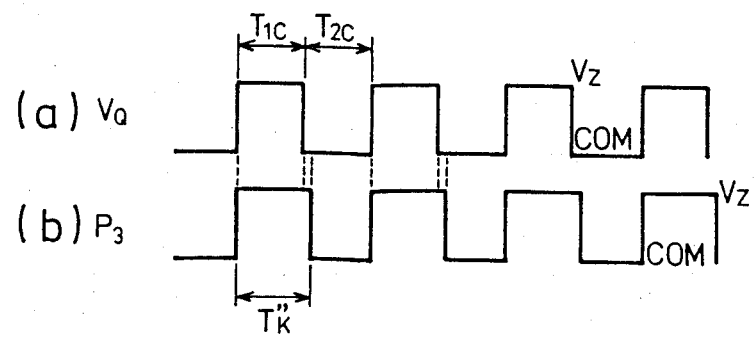
FIG. 16, comprising lines A,B, is a waveform diagram depicting waveforms appearing at different parts of the circuit of FIG. 15.

FIG. 15 depicts another illustrative zero point correcting circuit 24 wherein the relationship of pulse duration is set at $T_K'' \approx T_{1C}$. The FIG. 15 circuit differs from the FIGS. 11 and 13 circuits in that the switch SW₁₁ is omitted. The relation $T_K'' \approx T_{1C}$ is realized by suitably selecting the values of resistor R_M and capacitance C_M of monstable circuit Q₃, and a pulse signal P₃ is applied to resistor R₄ and capacitance C₄ to obtain a voltage $V_\epsilon''$ at the non-inverting input end (+) of amplifier Q₄. FIG. 16, lines A and B show waveforms of output signal $V_Q$ and pulse signal P₃ at different parts of the circuit of FIG. 15. As is apparent from this waveform diagram, voltage $V_\epsilon''$ is give as follows.

$$V_\epsilon'' = \frac{T_K''}{T_{1C} + T_{2C}} V_z = \frac{T_K''}{2T_{1C}} V_z \quad (33)$$

$$= \frac{T_K''}{2A\epsilon} V_z$$

Thus, voltage $V_\epsilon''$ is obtained which relates to a zero point fluctuation of the sensor section caused by changes of temperature and pressure, and can be used as a compensation signal for compensating the zero point.

Figure 17:
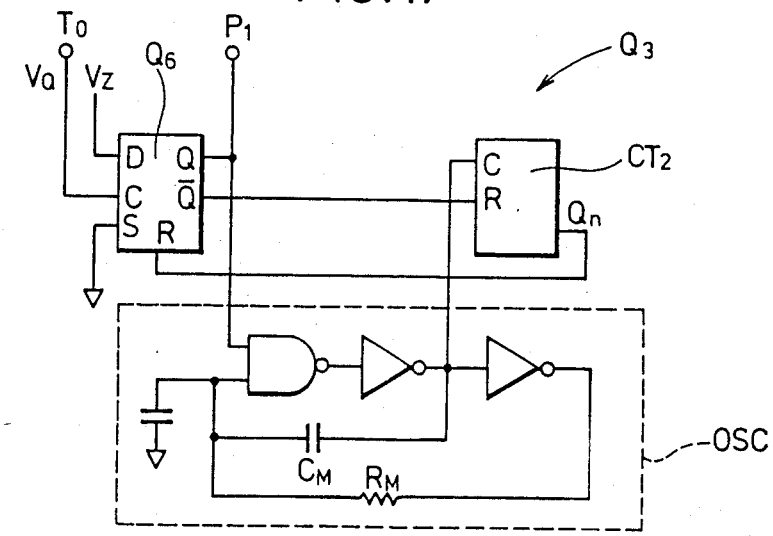
FIG. 17 is a circuit diagram depicting details of the monostable circuit of FIGS. 11, 13, 15.

FIG. 17 depicts details of monostable circuit Q₃ of FIGS. 11, 13, 15, and comprises a D-type flip-flop Q₆, a n-bit counter CT₂, and an oscillator OSC having an oscillation period which can be adjusted by resistor R_M and capacitor C_M. Due to the leading edge of output signal $V_Q$ applied to terminal T₀, the voltage at the output end Q of flip-flop Q₆ rises up to voltage $V_z$ applied to data input D. At the same time, an inverted output $\overline{Q}$ falls and is applied to terminal R of counter CT₂, and counter CT₂ starts to count a frequency applied from oscillator OSC to its input end C up to a certain count. After completion of counting, the potential of output end $Q_n$ of counter CT₂ is lowered to reset, via terminal R, the flip-flop Q₆. As a result, the potential of output end Q of flip-flop Q₆ is lowered to thereby generate a pulse of a certain duration $T_K$. Since the oscillation frequency varies as capacitor C_M and/or resistor R_M is changed, it is possible to change the pulse duration.

Figure 18:
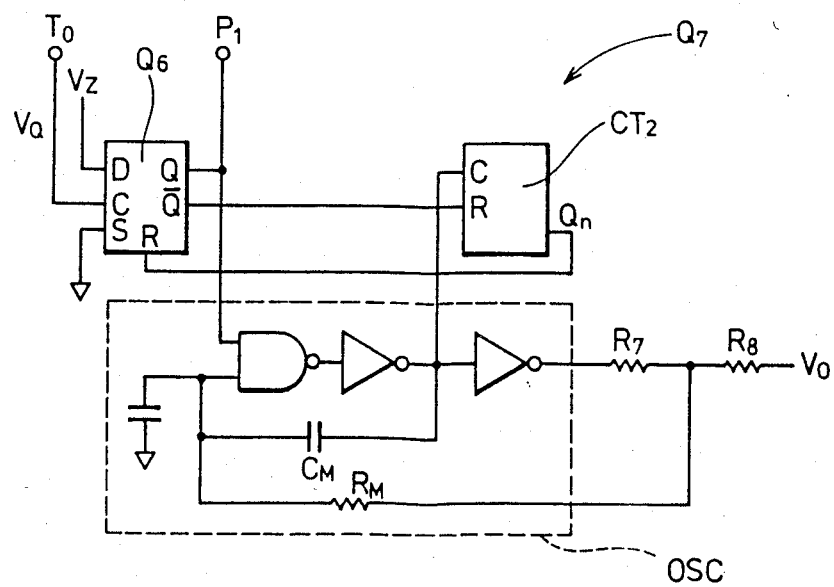
FIG. 18 is a circuit diagram depicting a monostable circuit used when the amount of correction for zero point is large.

FIG. 18 depicts another illustrative monostable circuit Q₇ used when the amount of correction of the zero point is large. The voltage $V_\epsilon$ for correction of the static pressure zero involves no particular problem with respect to non-linearity when the amount of correction is small. However, voltage $V_\epsilon$ exhibits some non-linearity with respect to differential pressure ΔP when the amount of correction becomes large. In such a case, monostable circuit Q₇ shown in FIG. 18 is used. This circuit differs from the FIG. 17 circuit in that a resistor R₇ is inserted between the output end of oscillator OSC and resistor R_M, and one end of a resistor R₈ is connected to the connection point between resistors R_M and R₇ with the other end receiving variable voltage $V_o$, for example from circuit 5.

A current supplied from variable voltage $V_o$ through resistor R₈, is caused to flow and to be added to a current flowing through resistor R_M nornally at fixed level so that pulse duration $T_K$ is made variable depending upon variable voltage $V_o$ to thereby correct errors of non-linearity.

Figure 19:
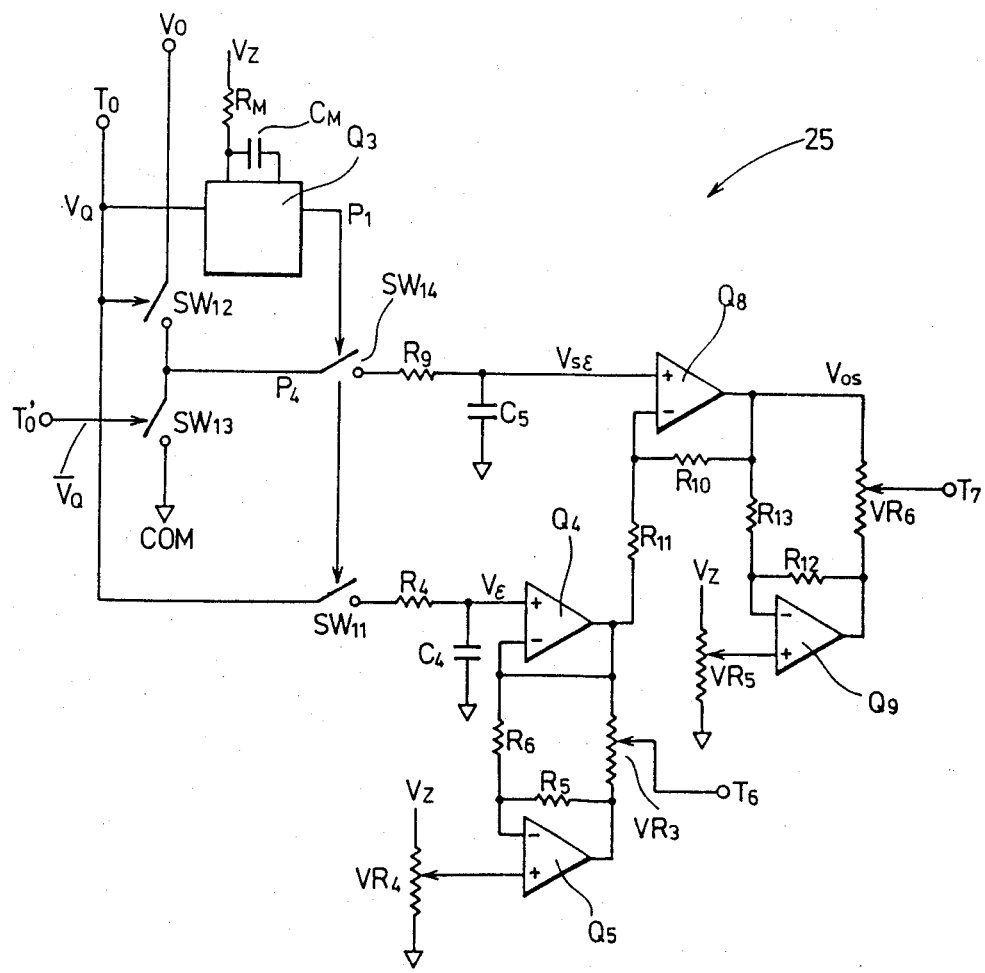
FIG. 19 is a circuit diagram depicting a span correcting circuit for correcting deviation of the span resulting from a change of temperature or static pressure.

FIG. 19 depicts an illustrative span correcting circuit 25 for correcting deviation of the span of the sensor section caused by changes of temperature and static pressure. Switches SW₁₂ and SW₁₃ are connected mutually in series and variable voltage $V_o$ is applied to the common point thereof. The connection point between switches SW₁₂ and SW₁₃ is connected to one end of a switch SW₁₄. A filter made up of a resistor R₉ and a capacitor C₅ is inserted between the other end of switch SW₁₄ and the non-inverting input end (+) of an amplifier Q₈. A resistor R₁₀ is connected between the output end and the inverting input end (−) of amplifier Q₈. A resistor R₁₁ is connected between the inverting input end (−) of amplifier Q₈ and the output end of amplifier Q₄. To the non-inverting end (+) of amplifier Q₉ is applied a voltage generated by dividing voltage $V_z$ means of a variable resistor $VR_5$. A resistor $R_{12}$ is connected between the inverting input end (−) and the output end of amplifier $Q_9$. The output end of amplifier $Q_8$ is connected through a resistor $R_{13}$ to inverting input end (−) of the amplifier $Q_9$ and also through a variable resistor $VR_6$ to the output end of amplifier $Q_9$. A terminal $T_7$ is taken out from the intermediate point of variable resistor $VR_6$. On the other hand, the input end of switch $SW_{11}$ is connected to terminal $T_o$, to which output signal $V_Q$ is applied.

Switches $SW_{14}$ and $SW_{11}$ are controlled by means of monostable circuit $Q_3$. Pulse signal $P_1$ is set by resistor $R_M$ and capacitor $C_M$ of monostable circuit $Q_3$ so that pulse duration $T_K$ is wider than pulse duration $T_{1C}$ of output signal $V_Q$ ($T_{1C} < < T_K$). Switch $SW_{11}$ is controlled by means of output signal $V_Q$, whereas switch $SW_{13}$ is controlled by means of a signal generated by inverting the output signal $V_Q$ and applied to a terminal $T_o'$.

Figure 20:
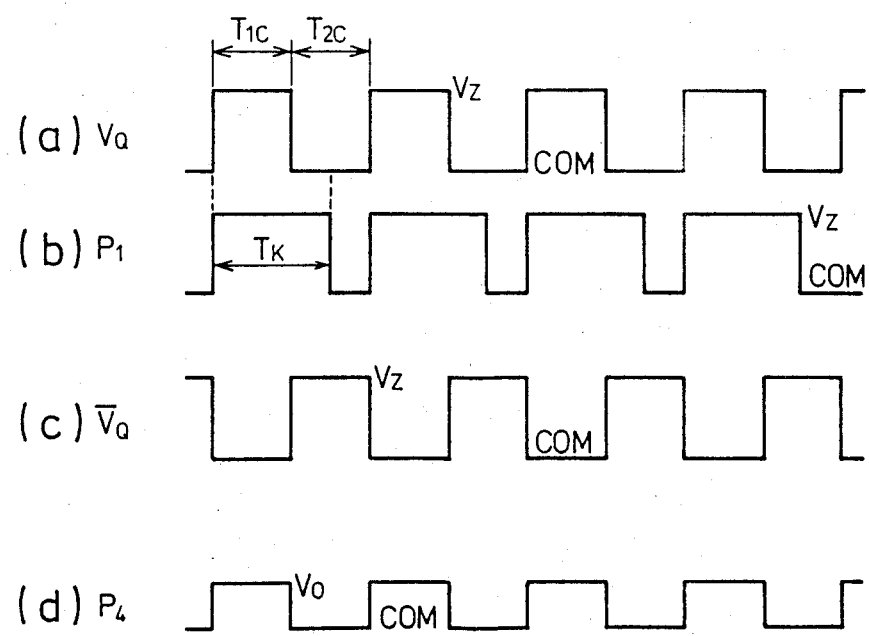
FIG. 20, comprising lines A,B,C,D, is a waveform diagram depicting waveforms appearing at different parts of the circuit of FIG. 19.

Operation of the above circuit will now be described with reference to FIG. 20, comprising lines A, B, C, D. By controlling switch $SW_{12}$, by means of output signal $V_Q$ (see FIG. 20, line A) and switch $SW_{13}$ by means of the inverted signal $\overline{V}_Q$ (see FIG. 20, line C) which is generated by inverting output signal $V_Q$, there is obtained a pulse signal $P_4$ (See FIG. 20, line D) at the connection point between the switches $SW_{13}$, $SW_{13}$ whose peak value is $V_o$ and whose pulse duration is proportional to the permittivity $\epsilon$ of the sealing liquid of the sensor section. By controlling further by means of the pulse signal $P_1$ (see FIG. 20, line B) which is the output of monostable circuit $Q_3$ there is obtained at the non-inverting input end (+) of amplifier $Q_8$ a voltage $V_{s\epsilon}$ relating to the differential pressure $\Delta P$ and the permittivity $\epsilon$, which is shown as follows.

$$V_{s\epsilon} = \frac{T_{1C}}{T_K} V_o \tag{34}$$

By using equations (30) and (24), the following is obtained.

$$V_{s\epsilon} = \frac{A\epsilon}{T_K} \cdot \frac{1}{2} (1 - k\Delta P) V_z \tag{35}$$

$$= \frac{A\epsilon}{2T_K} V_z - \frac{kV_z}{2T_K} \epsilon \cdot \Delta P$$

On the other hand, voltage $V_\epsilon$ at the non-inverting input end (+) of amplifier $Q_4$ is given by equation (31).

Then, by processing voltages $V_{s\epsilon}$ and $V_\epsilon$ in accordance with the following equation in amplifier $Q_8$, a voltage $V_{os}$ proportional to permittivity $\epsilon$ and differential pressure $\Delta P$ is obtained at the output end of amplifier $Q_8$, as follows.

$$V_{os} = 2V_{s\epsilon} - V_\epsilon \tag{36}$$

$$= \frac{kV_x}{T_K} \cdot \epsilon \cdot \Delta P$$

Variable resistor $VR_3$ is for applying the correction signal of the zero point, which signal is used for correction of span error by means of variable resistor $VR_6$.

Figure 21:
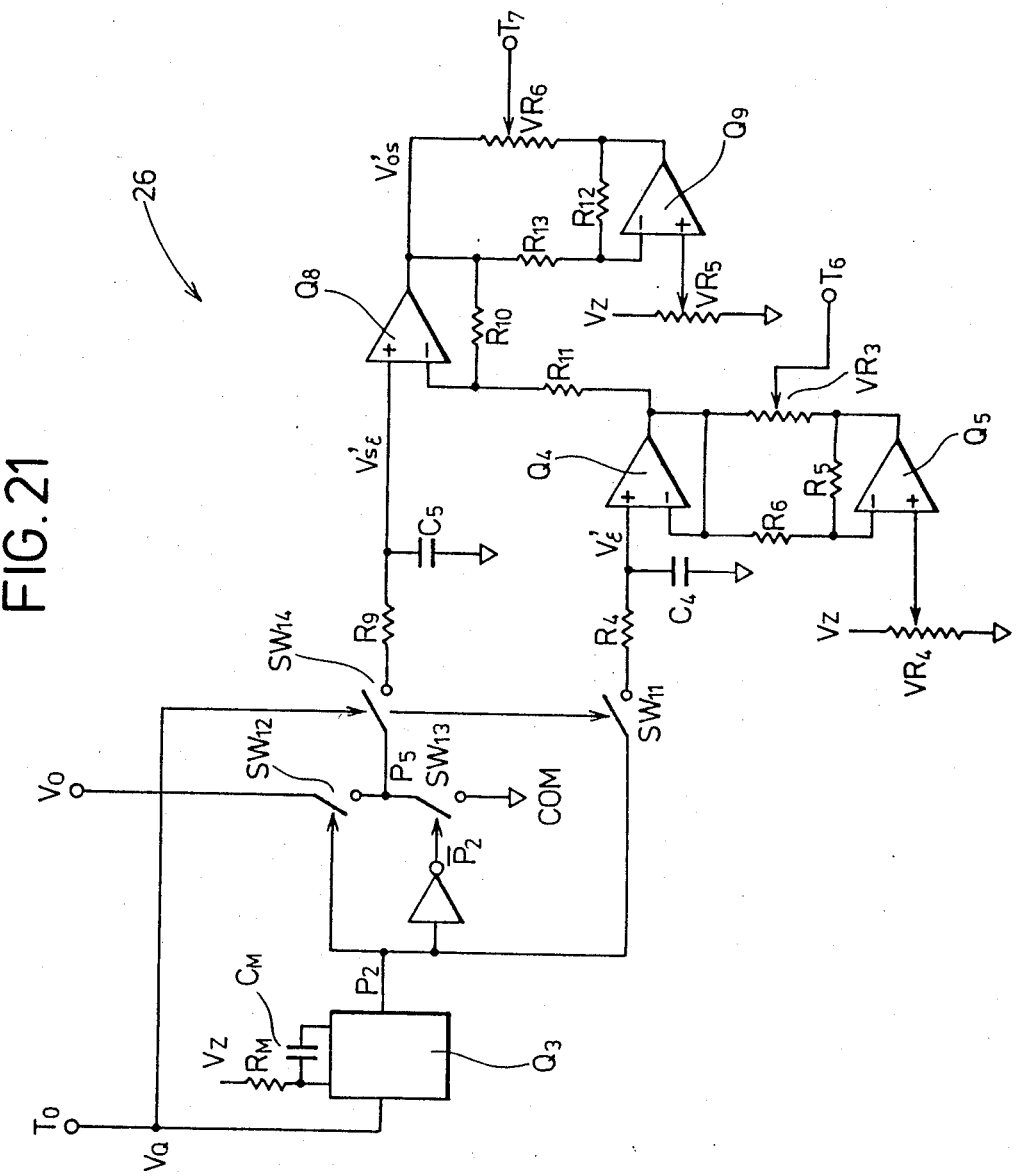
FIG. 21 is a circuit diagram depicting a span correcting circuit when the relationship of pulse duration is set at $T_K' < T_{1c}$.

FIG. 21 depicts another illustrative span correcting circuit 26 wherein the relationship of pulse duration is set at $T_K' < T_{1C}$. The FIG. 21 circuit differs from the FIG. 19 circuit in that switches $SW_{11}$ and $SW_{14}$ are controlled by means of output signal $V_Q$ of counter $CT_1$ (of FIG. 5) and switches $SW_{12}$ and $SW_{13}$ are controlled by means of pulse signal $P_2$ of monostable circuit $Q_3$ and its inverted pulse signal $\overline{P}_2$.

Figure 22:
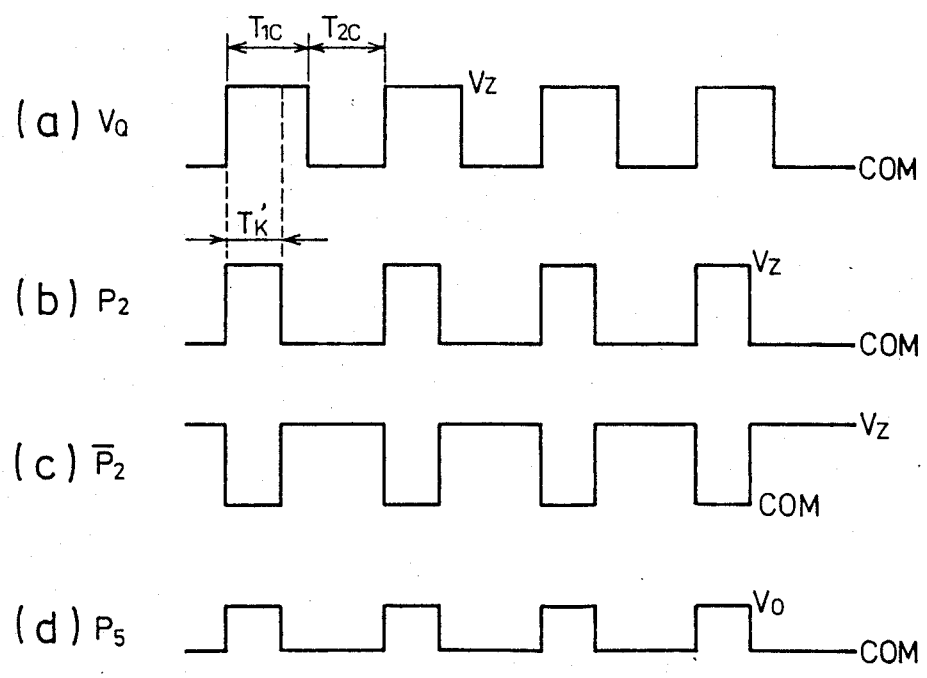
FIG. 22, comprising lines A,B,C,D, is a waveform diagram depicting waveforms appearing a different parts of the circuit of FIG. 21.

FIG. 22, comprising lines A, B, C, D, shows waveforms at different parts of the FIG. 21 circuit. Since switches $SW_{11}$ and $SW_{14}$ are opened and closed by means of output signal $V_Q$, calculation of $T_K'$ and $T_{1C}$ is inverse to the case of FIG. 21, so that a voltage $V_{s\epsilon}'$ generated by smoothing a pulse signal $P_5$ at the connection between switches $SW_{12}$ and $SW_{13}$ becomes as follows.

$$V_{s\epsilon}' = \frac{T_K'}{T_{1C}} V_o \tag{37}$$

By using equations (30) and (24), the following is obtained.

$$V_{s\epsilon}' = \frac{T_K'}{A\epsilon} \cdot \frac{1}{2} (1 - k\Delta P) V_z \tag{38}$$

$$= \frac{T_K'}{2A\epsilon} V_z - \frac{kT_K' V_z}{2A} \cdot \frac{\Delta P}{\epsilon}$$

On the other hand, since voltage $V_\epsilon'$ at the non-inverting input end (+) of amplifier $Q_4$ is given by equation (32), by using it and performing the following calculations by the use of amplifier $Q_8$, there is obtained at the output end of samplifier $Q_8$ a voltage $V_{os}'$ relating to permittivity $\epsilon$ and differential pressure $\Delta P$, as follows.

$$V_{os}' = 2V_{s\epsilon}' - V_\epsilon' \tag{39}$$

$$= \frac{kT_K' V_z}{2A} \cdot \frac{\Delta P}{\epsilon}$$

In case the extent of change of permittivity $\epsilon$ is small, $1/\epsilon$ also relates to the temperature and static pressure and changes linearly. Thus, the inverse permittivity signal is usable as the compensation signal for compensating the span.

Figure 23:
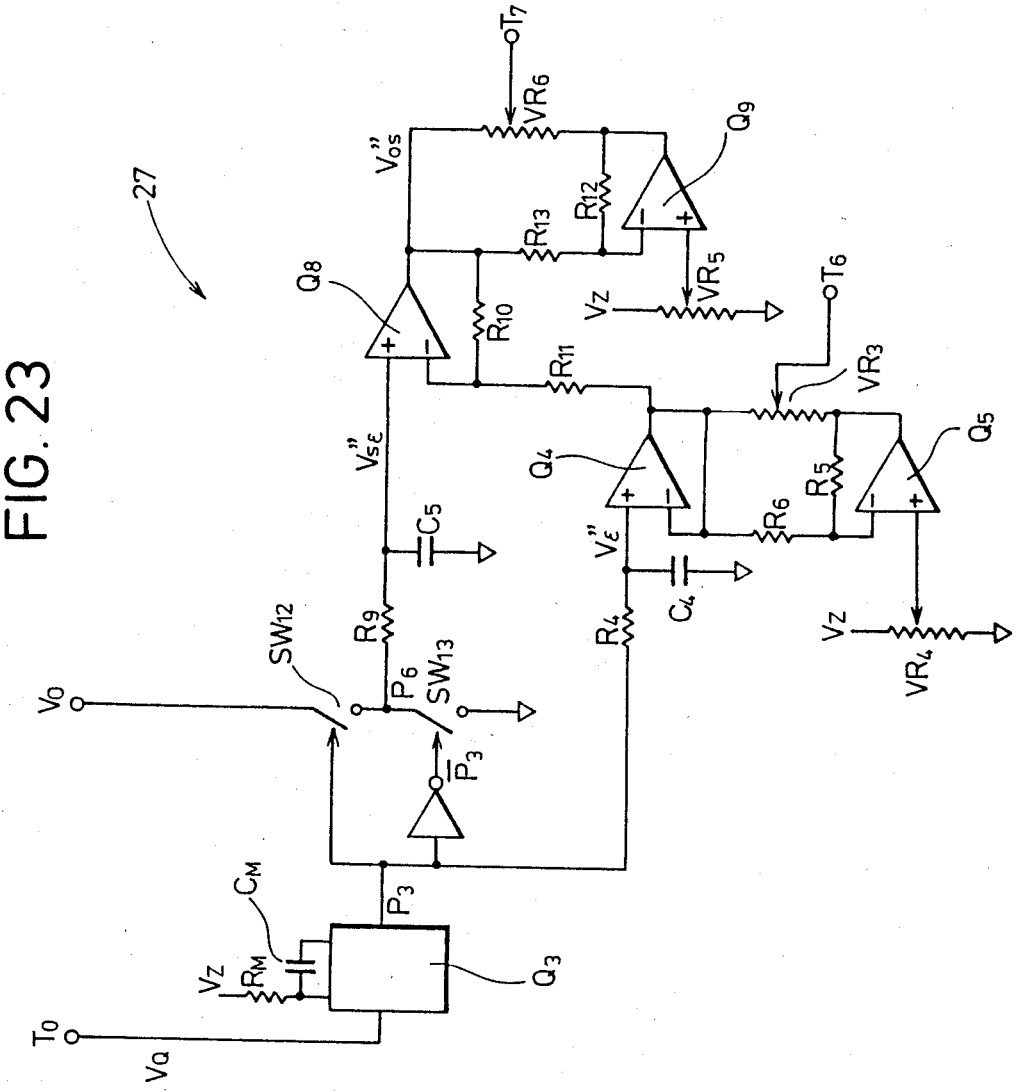
FIG. 23 is a circuit diagram depicting a span correcting circuit when the relationship of upulse duration is set at $T_K'' \approx T_{1c}$.
Figure 24:
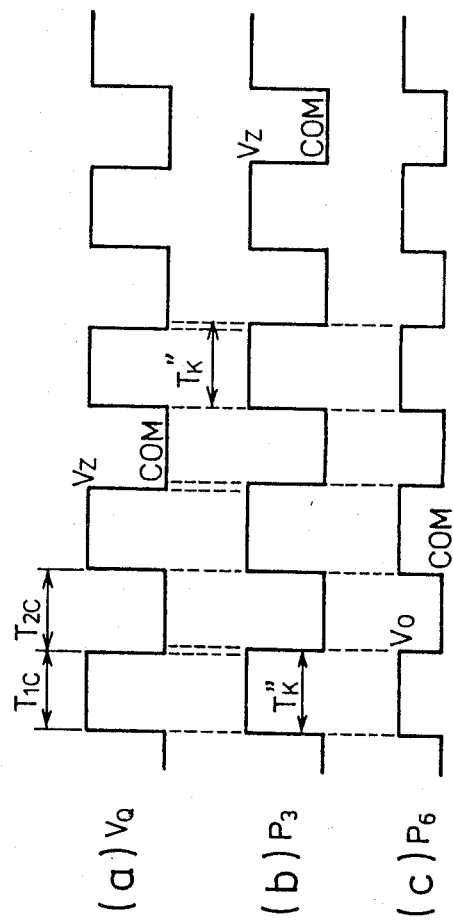
FIG. 24, comprising lines A,B,C, is a waveform diagram depicting waveforms appearing at different parts of the circuit of FIG. 23.

FIG. 23 depicts another illustrative span correcting circuit 27 wherein the relationship of pulse duration is set at $T_K'' \approx T_{1C}$. The circuit of FIG. 23 differs from that of FIG. 21 in that switches $SW_{14}$ and $SW_{11}$ are omitted. Specifically, the relation $T_K'' \approx T_{1C}$ is realized by suitably selecting the values of resistor $R_M$ and capacitor $C_M$ of monostable circuit $Q_3$. Pulse signal $P_3$ is used to control variable voltage $V_o$. The resultant pulse signal $P_6$ is applied to resistor $R_9$ and capacitor $C_5$, to obtain a $V_{s\epsilon}''$ at the non-inverting input end (+) of amplifier $Q_8$. FIG. 24, lines A, B, and C show waveforms at different parts of FIG. 23. As is apparent from the waveform diagram, voltage $V_{s\epsilon}''$ is given as follows.

$$V_{s\epsilon}'' = \frac{T_K''}{T_{1C} + T_{2C}} V_o \tag{40}$$

By using equations (30) and (24), the following is obtained.

$$V_{s\epsilon}'' = \frac{T_K''}{2A\epsilon} \cdot \frac{1}{2} (1 - k\Delta P) V_z \tag{41}$$

-continued $$= \frac{T_K''V_z}{4A\epsilon} - \frac{kT_K''V_z}{4A} \cdot \frac{\Delta P}{\epsilon}$$

On the other hand, since voltage $V_\epsilon''$ at the non-inverting input end (+) of amplifier $Q_4$ is given by equation (33), by using it and performing the following calculations in amplifier $Q_8$, there is obtained at the output end of amplifier $Q_8$ a voltage $V_{os}''$ relating to permittivity $\epsilon$ and differential pressure $\Delta P$ as follows.

$$V_{os}'' = = 2V_{s\epsilon}'' - V_\epsilon'' \qquad (42)$$

$$= \frac{kT_K''V_z}{2A} \cdot \frac{\Delta P}{\epsilon}$$

Although the results above are identical to that of equation (39), switches $SW_{11}$ and $SW_{14}$, are advantageously, removed.

Figure 25:
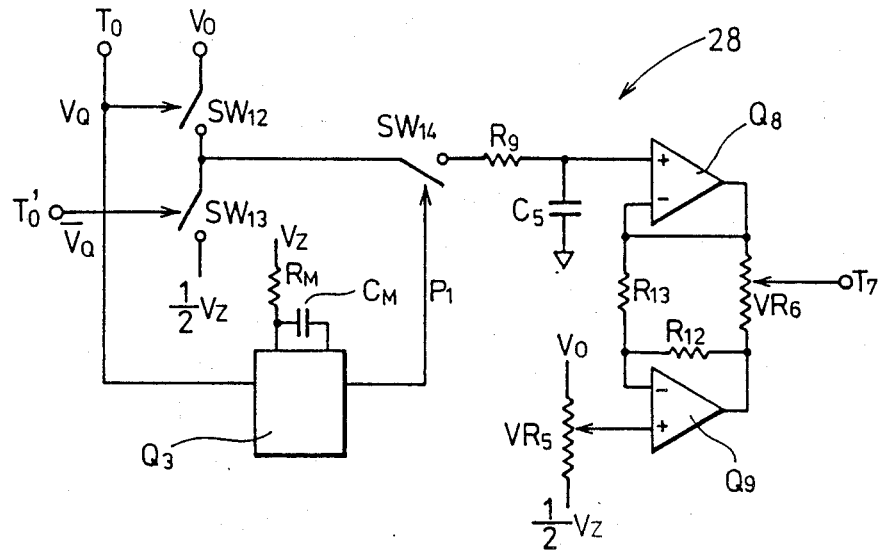
FIG. 25 is a circuit diagram depicting a span correcting circuit corresponding to that shown in FIG. 19 without any process section for eliminating constant terms.
Figure 26:
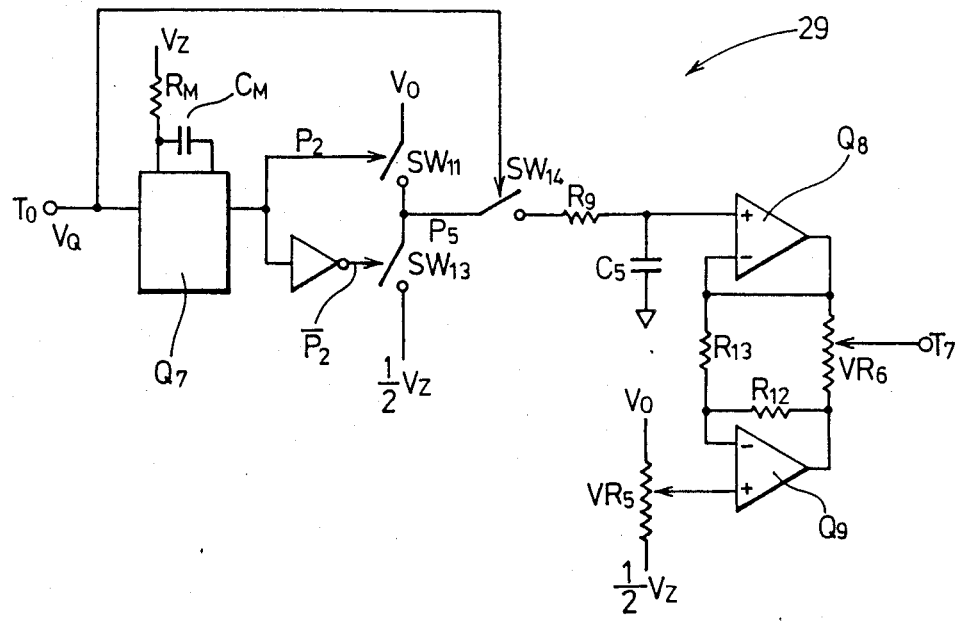
FIG. 26 is a circuit diagram depicting a span correcting circuit corresponding to that shown in FIG. 21 without any process section for eliminating constant terms.

FIGS. 25 and 26 correspond to FIGS. 19 and 21, respectively, and show span correcting circuits 28,29, respectively, from which are omitted means for performing calculation of eliminating constant terms, indicated in the equations (35) and (38). That is, the FIG. 25 circuit and the FIG. 26 circuit differ from the FIGS. 19 and 21 circuits in that the order end of switch $SW_{13}$ and one end of the variable resistor $VR_5$ are connected to the midway potential point, whose potential is one-half of the source voltage $V_z$, and to the other end of variable resistor $VR_5$ is applied variable voltage $V_o$. For reference, if the circuit is modified so as to use the pulse signal $P_3$ shown in FIG. 23, switch $SW_{14}$ can be omitted from the circuit of FIG. 26.

Figure 27:
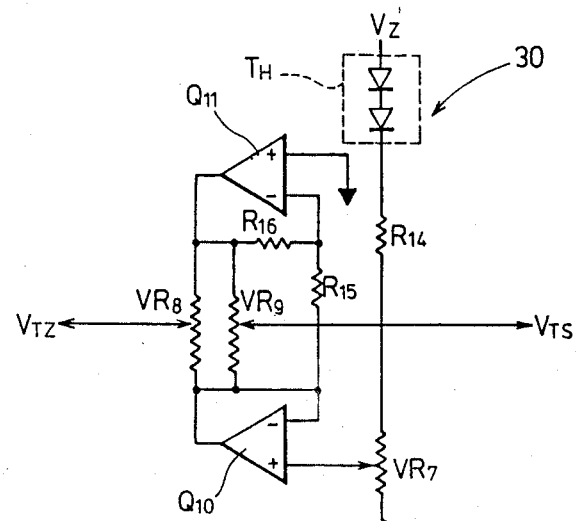
FIG. 27 is a circuit diagram depicting a temperature compensating circuit for compensating for change of zero point and span caused by change of temperature inside the converting section.

FIG. 27 depicts an illustrative temperature compensation circuit for compensating for changes of zero point and span (referred to herein as zero/span) caused by changes in temperature inside the converting section, wherein temperature compensation circuit 30, which generates a temperature compensation signal comprises a temperature sensing element $T_H$ which may be formed by a diode, thermistor, resistor of large temperature coefficient, etc, and is disposed inside the converting section. A source voltage $V_z$ is applied across the series circuit comprising the sensing element $T_H$, resistor $R_{14}$, variable resistor $VR_7$, and resistor $R_{15}$.

An amplifier $Q_{10}$ forms a voltage follower whose non-inverting input end (+) receives the voltage at the intermediate point of variable resistor $VR_7$ and whose output end is connected to variable resistors $VR_8$, and $VR_9$ and resistor $R_{15}$. The non-inverting input end (+) of amplifier $Q_{11}$ is connected to a midway potential point, and its inverting input end (−) is connected through a resistor $R_{15}$ to the output end of amplifier $Q_{10}$ and further through a resistor $R_{16}$ to the output end of amplifier $Q_{11}$, so that a voltage which is the inverse of the voltage at the output end of amplifier $Q_{10}$ is obtained at the output end of amplifier $Q_{11}$. Variable resistors $VR_8$ and $VR_9$ are connected between the output end of amplifier $Q_{10}$ and $Q_{11}$, and a temperature zero point signal $V_{Tz}$ and a temperature span signal $V_{Ts}$ are obtained at the intermediate points of the variable resistors $VR_8$ and $VR_9$, respectively. The circuit parameters are set so that the voltage can assume zero at the center of each of variable resistors $VR_8$ and $VR_9$ and is adjustable positively and negatively. Temperature zero point signal $V_{Tz}$ is added so as to be included in variable voltage $V_o$, and the temperature span signal $V_{Ts}$ is added so as to correct the source voltage $V_z$. Thus, these signals correct zero point and the span, respectively.

Figure 28:
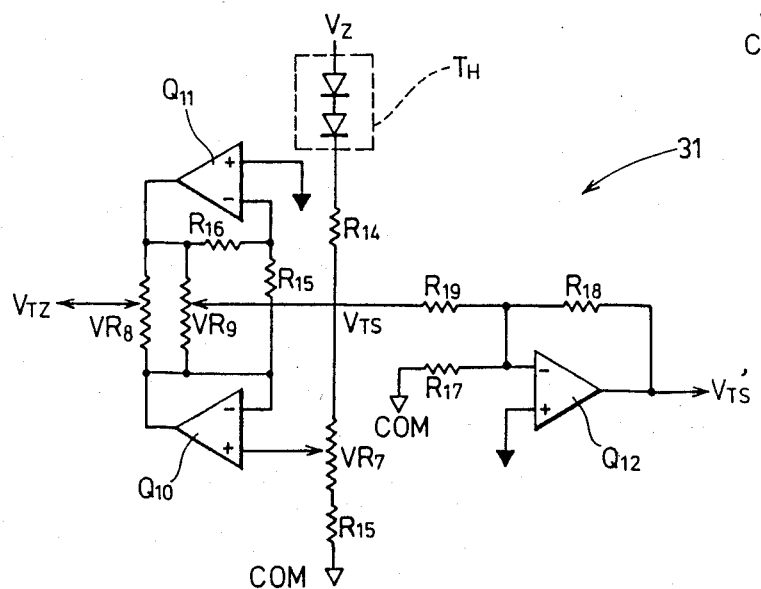
FIG. 28 is a circuit diagram depicting a modification of the temperature compensating circuit of FIG. 27.

FIG. 28 depicts an illustrative temperature compensation circuit 31 which is designed so that at the time temperature span signal $V_{Ts}$ of temperature compensating circuit 30 of FIG. 27, is applied so as to correct the source voltage $V_z$, that span signal $V_{Ts}$ is applied in a low impedance mode. The non-inverting input end (+) of amplifier $Q_{12}$ is connected to a midway potential point. The inverting input end (−) of amplifier $Q_{12}$ is connected through a resistor $R_{17}$ to the common potential point COM and further through a resistor $R_{18}$ to an output end of amplifier $Q_{12}$. The temperature span signal $V_{Ts}$ is applied through a resistor $R_{19}$ to the inverting input end (−) of the amplifier $Q_{12}$ so that an impedance converted temperature span signal $V_{Ts}$ is obtained at its output end.

Figure 29:
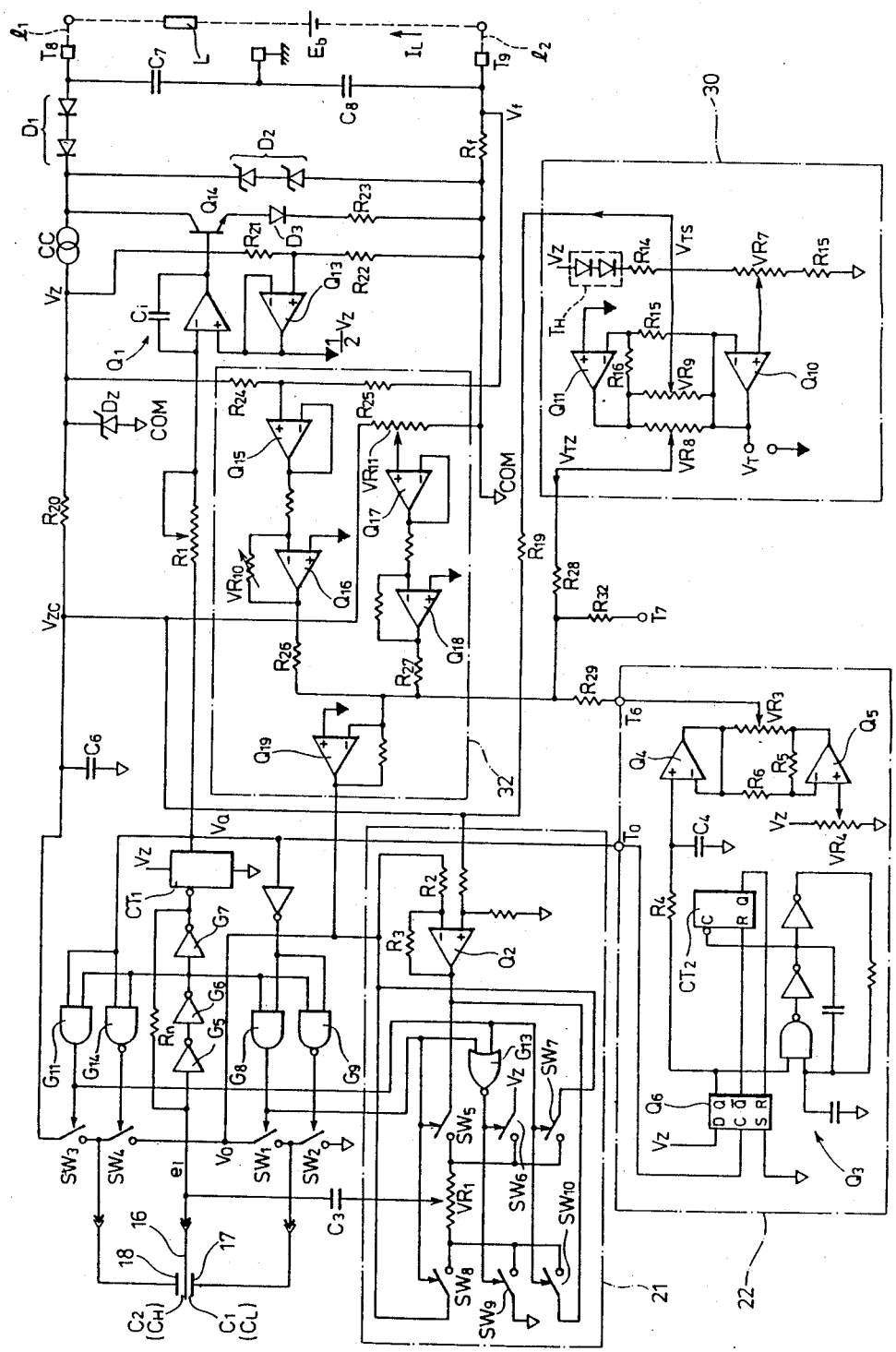
FIG. 29 is an overall circuit diagram depicting the invention as applied to a two wire transmission circuit.

FIG. 29 depicts an overal circuit diagram of the illustrative capacitive displacement transducer as apppplied to a two wire transmission system, wherein a power source $E_b$ is connected through a load L to transmission lines $l_1$ and $l_2$ of the two wire system. Across terminals $T_8$ and $T_9$ on the other end of transmission lines $l_1$ and $l_2$ are connected in series, a diode $D_1$, Zener diode $D_2$, and a feedback resistor $R_f$. Between the cathode of diode $D_1$ and the common potential point COM are connected in series a constant current circuit CC and a Zener diode $D_2$, so that source voltage $V_z$ of the circuit is created across the Zener diode $D_2$. This source voltage $V_z$ is applied to a filter made up of a resistor $R_{20}$ and a capacitor $C_6$, thereby becoming a source voltage $V_{zc}$.

The output signal $V_Q$ of the counter $CT_1$ is applied through resistor $R_1$ to the inverting input end (−) of integrator $Q_1$. On the other hand, the non-inverting input end (+) of integrator $Q_1$ is connected to the midway potential point. The midway potential point is realized on the output end of amplifier $Q_{13}$ forming a voltage follower which handles a voltage generated by dividing source voltage $V_z$ by use of resistors $R_{21}$ and $R_{22}$.

The voltage smoothed by the integrator $Q_1$ is applied to the base of a transistor $Q_{14}$ for controlling the current of the transmission lines $l_1$ and $l_2$ of the two wire system. The collector of the transistor $Q_{14}$ is connected to the connection point between diode $D_1$ and the constant current circuit CC, with its emitter connected through a diode $D_3$ and a resistor $R_{23}$ for temperature compensation of transistor $Q_{14}$ to the common potential point COM.

A feedback voltage $V_f$ generated on the feedback resistor $R_f$ by a load current $I_L$ flowing through load L is applied to a zero/span circuit 32 for adjusting the overall zero/span of the transducer.

A voltage generated, by dividing the voltage sum of the feedback voltage $V_f$ and the source voltage $V_z$, by means of resistors, $R_{24}$ and $R_{25}$, is applied to the non-inverting input end (+) of an amplifier $Q_{15}$ forming a voltage follower. The voltage at the output end of the amplifier $Q_{15}$ is applied to the input end of an inverting amplifier $Q_{16}$. The overall span of the transducer is adjusted by means of a variable resistor $VR_{10}$ connected between the input end and output end of the inverting amplifier $Q_{16}$.

On the other hand, the voltage at the intermediate point of variable resistor $VR_{11}$ connected between source voltage $V_{zc}$ and common potential point COM which is a divided part of the source voltage $V_{zc}$, is applied through a voltage follower $Q_{17}$ to an inverting amplifier $Q_{18}$. The variable resistor $VR_{11}$ for zero point adjustment is used to adjust the zero point of the entire circuit, and the inverting amplifier $Q_{18}$ is used to correct reversely fluctuations of source voltage $V_{zc}$ caused by temperature span signal $V_{Ts}$ of the temperature compensating circuit 30, so as to prevent double compensation which would otherwise take place in conjunction with temperature zero point signal $V_{Tz}$.

The outputs of inverting amplifiers $Q_{16}$ and $Q_{18}$ are applied through respective resistors $R_{26}$ and $R_{27}$ to an amplifier $Q_{19}$ and added together thereby, and fed back to the sensor section as variable voltage $V_o$.

The temperature span signal $V_{Ts}$ of circuit 30 is applied through resistor $R_{19}$ and added as a span compensation voltage to source voltage $V_{zs}$, and the temperature zero point signal $V_{Tz}$ is added through a resistor $R_{28}$ to amplifier $Q_{19}$ to achieve zero point compensation.

The zero point correcting circuit 22 for correcting deviation of the zero point resulting from changes of ambient temperature and/or static pressure receives output signal $V_Q$ of counter $CT_1$ through terminal $T_o$ and supplies the same addingly to amplifier $Q_{19}$ through terminal $T_6$ and resistor $R_{29}$.

Between terminals $T_8$ and $T_9$ is connected the series circuit comprising capacitors $C_7$ and $C_8$ having their connection point at ground. By this configuration, higher harmonic noises entrapped in transmission lines $l_1$ and $l_2$ are removed.

If it is necessary to correct deviations of the span resulting from changes of ambient temperature and/or static pressure, this is achieved by connecting the output terminal $T_7$ of the span correcting circuit 25–29 (see FIGS. 19, 21, 23, 25, 26) through a resistor $R_{32}$ to the input end of amplifier $Q_{19}$.

According to the foregoing circuit, the output signal $V_Q$ of counter $CT_1$ is applied to the input end of the integrator $Q_1$ and by the voltage at the output end of integrator $Q_1$, is controlled with the current flowing through transistor $Q_{14}$, so that load current $I_L$ is regulated. Feedback voltage $V_f$ generated on the feedback resistor $R_f$ by load current $I_L$ is applied to and is regulated by the zero/span circuit 32, thereby becoming load current $I_L$ of the span corresponding to a differential pressure ($\Delta P$) span, and fed back from amplifier $Q_{19}$ to the sensor section as variable voltage $V_o$. By this feedback, the circuit is controlled and balanced so that the voltage at the inverting input end (−) of integrator $Q_1$ becomes identical to that of midway potential point (i.e. $V_z/2$), irrespective of which side is switched and selected by counter $CT_1$ between the sides of capacitors $C_H$ and $C_L$. In the equilibrium state the load current $I_L$ corresponds to the differential pressure $\Delta P$.

Zero point fluctuation caused by a temperature change inside the transducer is compensated by regulating temperature zero point signal $V_{Tz}$ detected by the temperature sensing element $T_H$ by means of the variable resistor $VR_8$. Span fluctuation caused by such temperature change is compensated by regulating the temperature span signal $V_{Ts}$ by means of the variable resistor $VR_9$.

A deviation of the zero point resulting from changes of temperature or static pressure on the sensor section is compensated through adjustment of the variable resistor $VR_3$.

The adjustment procedure of static pressure zero point and temperature zero point and span for the circuit of FIG. 29 will now be described. In the first step, variable resistor $VR_7$ is adjusted so as to cause temperature signal $V_T$ obtained at the output end of amplifier $Q_{10}$ of temperature compensating circuit 30 to become 0 volts at the reference temperature, e.g. room temperature.

In the second step, variable resistor $VR_{11}$ is adjusted while giving differential pressure $\Delta P$, under the condition that the static pressure $P_s$ is zero at the reference temperature so as to cause the load current $I_L$ to become 0%; and then the variable resistor $VR_{10}$ is adjusted to cause the load current $I_L$ to become 100%.

In the third step, variable resistor $VR_3$ is adjusted while applying a static pressure $P_s$ to the diaphragm under the condition that differential pressure $\Delta P$ at the reference temperature is 0% to cause load current $I_L$ to become 0%, whereby the zero point of the sensor is compensated.

In the final, and fourth step, variable resistor $VR_8$ is adjusted while giving a high temperature change or low temperature change and applying differential pressure $\Delta P$ to the diaphragm under the condition that static pressure $P_s$ is zero so as to cause load current $I_L$ to become 0%, and further variable resistor $VR_9$ is adjusted so as to cause load current $I_L$ to become 100%.

This adjustment procedure is sufficient when done once. Thus, it is possible to realize within a short adjustment time, a displacement transducer of superior precision which is not unduly influenced by changes of static pressure and ambient temperature.

Figure 30:
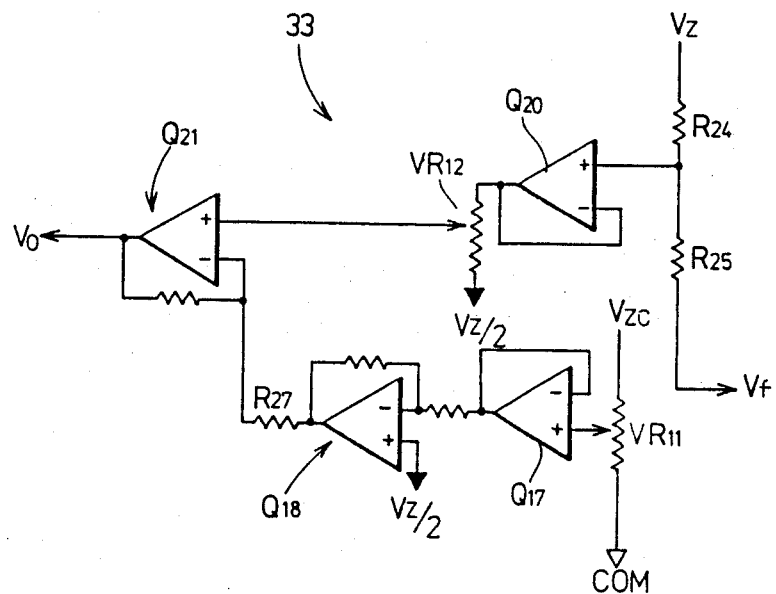
FIG. 30 is a circuit diagram depicting another illustrative embodiment of a zero point and span (called "zero/span") circuit.

FIG. 30 depicts another illustrative zero/span circuit 33, which differs from the zero/span circuit 32 of FIG. 29, in that from the connection point between resistors $R_{24}$ and $R_{25}$, its voltage is derived by means of a voltage follower $Q_{20}$, and the span is adjusted by means of voltage follower $Q_{20}$ and the midway potential point. The voltage at the intermediate point of variable resistor $VR_{12}$ is applied to the non-inverting input end (+) of amplifier $Q_{21}$ and provided through amplifier $Q_{21}$ as variable voltage $V_o$. In this case, a magnification degree smaller than one cannot be obtained, which is different from the case of the zero/span circuit 32 of FIG. 29.

Figure 31:
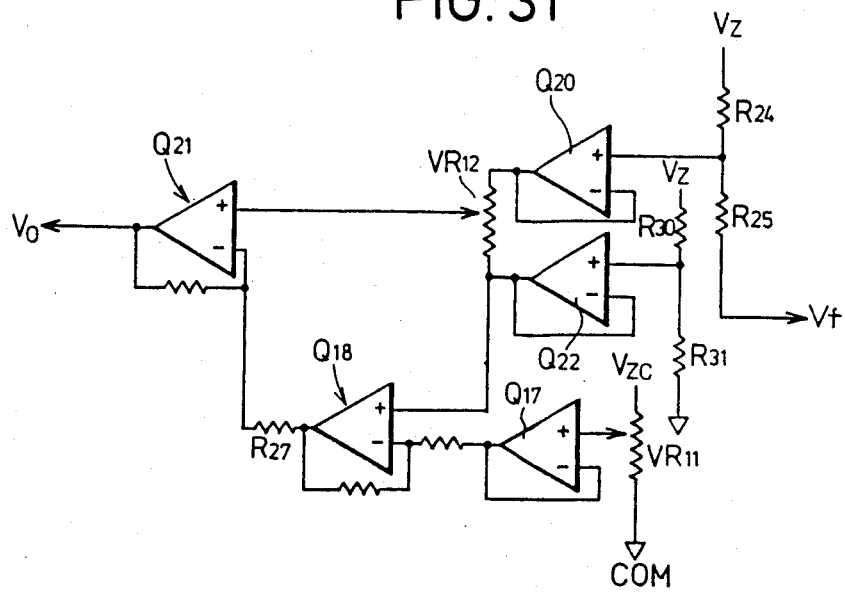
FIG. 31 is a circuit diagram depicting another illustrative zero/span circuit.

FIG. 31 depicts still another illustrative zero/span circuit 34, which differs from he zero/span circuit 32 of FIG. 29 and is used when $V_{zc}/2$ is selected by means of amplifier $Q_{13}$ as the potential of the midway potential point and $V_{zc}$ as the source voltage of counter $CT_1$. Thus, in contrast to zero/span circuits 32 and 33, in this circuit 34, a voltage generated by dividing the source voltage $V_z$ by means of resistors $R_{30}$ and $R_{31}$, is applied through a voltage follower $Q_{22}$ to one end of variable resistor $VR_{12}$ for span adjustment.

As described above, the discharging circuit is constructed without using a complex constant value current limiting circuit such as used in the prior art, thereby eliminating adverse effects of fixed capacitances and distributed capacitances. Also, in the invention, it is possible to compensate for deviation of the zero point and/or span resulting from fluctuation of ambient temperature and/or static pressure, by using information contained in the differential pressure signal, thereby producing a capacitive displacement transducer of superior precision.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A capacitive displacement transducer comprising
a first capacitor and a second capacitor formed of a first electrode, a second electrode, and a movable electrode, said first electrode and said second electrode being disposed opposite to said movable electrode, and having capacitances which change differentially in response to physical displacement to be detected changing the position of said movable electrode with respect to said first and second electrodes;
amplifying means for detecting the potential of said movable electrode and for generating an output signal;
negative feedback means for supplying an inverted current to an input end of said amplifying means;
counting means for counting change of an output level of said output signal from said amplifying means and for producing an output pulse;
integrating means for integrating said output pulse of said counting means and for producing an output signal;
first switch means for switching, by means of said output signal from said amplifying means and said output pulse from said counting means, and for applying a voltage relating to said output signal from said integrating means and a reference voltage, to said first capacitor;
second switch means for switching, by means of said output signal from said amplifying means and said output pulse from said counting means, and for applying said voltage relating to said output signal from said integrating means and a source voltage to said second capacitor; and
fixed capacitance correcting means for applying a voltage relating to difference between said source voltage and said voltage relating to said output signal from said integrating means to said movable electrode through a fixed impedance.

2. The transducer of claim 1, wherein said fixed capacitance correcting means comprises means for applying a phase inverted voltage through a third capacitor to said movable electrode, said phase inverted voltage being opposite in phase to a voltage applied to either said first capacitor or said second capacitor in an oscillating state of an oscillator circuit formed by said amplifying means inclusive of either said first capacitor or said second capacitor and said negative feedback means.

3. The transducer of claim 1, wherein said fixed capacitance correcting means comprises means for applying a divided voltage obtained from a voltage dividing means through a third capacitor to said movable electrode; and wherein means applies to said voltage dividing means an in-phase voltage in phase with and a phase-inverted voltage opposite to a voltage applied to either said first capacitor or second capacitor in an oscillating state of an oscialltor formed by said amplifying means inclusive of either said first or said second capacitor and said negative feedback means.

4. The transducer of calim 1, wherein said fixed capacitance correcting means comprises means for applying an adjustment voltage obtained from an adjustment means through a compensation resistor to said movable electrode; and wherein comprising means for applying to said adjustment means a difference voltage between said source voltage and said output signal of said integrating means and an output voltage for providing adjustment voltage having a value which ranges between said voltages.

5. A capacitive displacement transducer comprising
a first capacitance and a second capacitance comprising first electrode and second electrode disposed opposite to a movable electrode common to said first and second capacitances, and having capacitances which change differentially in response to a physical displacement to be detected being applied to said movable electrode;
amplifying means for detecting the potential of said movable electrode and for producing an output signal;
negative feedback means for supplying an inverted current to the input end of said amplifying means;
counting means for counting a change of the output of said output signal from said amplifying means and for producing an output pulse;
integrating means for integrating said output pulse from said counting means and for producing an output signal;
first switch means for switching, by means of said output signal from said amplifying means and said output pulse from said counting means, and for applying a voltage relating to said output signal from said integrating means and a reference voltage to said first capcitance;
second switch means for switching, by means of said output signal from said amplifying means and said output pulse from said counting means, and for applying said voltage relating to said output signal from said integrating means and a souce voltage to said second capacitance; and
a zero point and scan compensation means comprising a monostable circuit for generating a pulse of a predetermined duration in synchronism with said output pulse from said counting means, for performing a given calculation by use of said pulse of said predetermined duration from said monostable circuit and said output pulse from said counting means, to compensate for fluctuations of said zero point and said scan, in conjunction with voltage relating to said output signal from said integrating means.

6. The transducer of claim 5, wherin the pulse duration of said pulse from said monostable circuit is set to be wider than the pulse duration of said output pulse from said counting means; and wherein said zero point and span compensation means adds a voltage, obtained by controlling use of said pulse of said predetermined duration a switch for switching said output pulse from said counting means to said voltage relating to said output signal from said integrating means, to thereby correct the zero point.

7. The transducer of claim 5, wherein the pulse duration of said pulse from said monostable circuit is set to be narrower than the pulse duration of said output pulse of said counting means; and wherein said zero point and scan compensation means adds a voltage, obtained by controlling use of said output pulse of said counting means, a switch for switching said pulse of said predetermined duration, to said voltage relating to said output signal from said integrating means, to thereby correct the zero point.

8. The transducer of claim 5, wherein the pulse duration of said pulse from said monostable circuit is set to be substantially identical to the pulse duration of said output pulse from said counting means; and wherein said zero point and scan compensating means adds an average voltage, obtained by averaging an output voltage obtained from said monostable circuit, to the voltage relating to said output signal from said integrating means, to thereby correct the zero point.

9. The transducer of claim 5, wherein the pulse duration of said pulse from said monostable circuit is set to be wider than the pulse duration of said output pulse from said counting means; and wherein said zero point and scan compensating means adds a span correcting signal, obtained through a given calculation performed by use of an average voltage obtained by switching in a switch by use of said pulse of said predetermined duration, a pulse signal generated by converting said output signal from said integrating means by use of said output pulse from said counting means, so as to have a pulse duration identical to that of said output pulse from said counting means, and of another average voltage obtained by switching said output pulse from said counting means by use of aid pulse of said predetermined duration, to said voltage relating to said output signal from said integrating meand, to thereby correct said span.

10. The transducer of claim 5, wherein the pulse duration fo said pulse from said monostable circuit is set to be narrower than the pulse duration of said output pulse from said counting means; and wherein said zero point and scan compensating meand adds a span correctin signal, obtained through a given calculation perfomred by use of an average voltage obtained by averaging a pulse signal generated by switching said output signal from said integrating means by use of said pulse of said predetermined duration so as to have a pulse duration identical to that of said pulse of predetermined duration, generated in synchronism with said output pulse from said counting means, and of another average voltage obtained by switching the output pulse from said counting means by use of said pulse of predetermined duration, to said voltage relating to said output signal from said integrating means, to thereby correct said span.

11. The transducer of calim 5, wherein the pulse duration of said pulse from said monostable circuit is set to be substantially identical to the pulse duration of said output pulse from said counting means; and wherein said zero point and scan compensating means adds a span correction signal, obtained through a given calculation performed by use of an average voltage obtained by averaging a pulse signal generted by switching said ouppot signal from said integrating means by use of said pulse of predetermined duration so as to have a pulse duration identical to that of said pulse of said predetermined duration generated in synchronism with said output pulse of said counting means and of another average voltage obtained by averaging said pulse of predetermined duration, to said voltage relating to said output signal from said integrating means, to thereby correct said span.

12. A capacitive type displacement transducer device, comprising
a first capacitance and a second capacitance comprising first electrode and second electrode disposed opposite to a movable electrode and having capacitances which change differentially in response to a physical displacement to be detected being applied to said movable electrode;
applifying means for detecting the potential of said movable electrode and for generating an output signal;
negative feedback means for supplying an inverted current to an input end of said amplifying means;
counting means for counting change of the output level of said output signal from said amplifying means and for generating an output pulse;
integrating means for integrating said output pulse from said counting means and for generating an output signal;
first switch means for switching, by means of said output signal from said amplifying means and said output pulse from said couning means, and for applying a variable voltage relating to said output signal from said integrating means and a reference voltage to said first capacitance;
second switch means for switching, by means of said output signal from said amplifying means and said output pulse from said counting means, and for applying said variable voltage relating to said output signal from said integrating means and a source voltage to said second capacitance;
voltage stabilizing means powered from an external source through two lines for energizing an internal circuit;
current adjusting means for adjusting current flowing through said two lines in response to said output signal from said amplifying means; and
voltage and current converting means for feeding back a voltage proportional to the current flowing through said two lines in the form of a variable voltage, whereby current corresponding to the physical displacement is transmitted while flowing through said two lines.

13. A capacitive displacement transducer comprising
a first capacitance and a second capacitance comprising first electrode and second electrode disposed opposite a movable electrode and having capacitances which change differentially in response to a physical displacement applied to said movable electrode;
amplifying means for detecting the potential of said movable electrode and for generating an output signal;
negative feedback means for supplying an inverted current to an input end of said amplifying means;
counting means for counting change of output level of said output signal from said amplifying means and for generating an output pulse;
integrating means for integrating said output pulse from said counting means and for generating an output signal;
first switch means for switching, by means of said output signal from said amplifying means and said output pulse from said counting means, and for applying a voltage relating to said output signal from said integrating means and a reference voltage to said first capcitor;
second switch means for switching, by means of said output signal from said amplifying means and said output pulse from said counting means, and for applying voltage relating to said output signal from said integrating means and a source voltage to said second capacitance; and
a temperature zero point and span compensating means, comprising a temperature sensing element disposed inside said transducer and an adjusting means for applying said source voltage to said temperature sensing element and adjusting a temperature responsive voltage thus generated, and means for adding the output of said adjusting means to either a variable voltage or said source voltage to compensate for fluctuation of temperature zero point and temperature scan.

* * * * *